US012551408B2

(12) United States Patent
Koike et al.

(10) Patent No.: US 12,551,408 B2
(45) Date of Patent: Feb. 17, 2026

(54) DRUG IMAGING DEVICE AND DRUG PACKAGING DEVICE

(71) Applicant: YUYAMA MFG. CO., LTD., Osaka (JP)

(72) Inventors: Naoki Koike, Osaka (JP); Masao Fukada, Osaka (JP); Ryosuke Fukamori, Osaka (JP); Thanhxuan Huynh, Osaka (JP)

(73) Assignee: YUYAMA MFG. CO., LTD., Osaka (JP)

(*) Notice: Subject to any disclaimer, the term of this patent is extended or adjusted under 35 U.S.C. 154(b) by 0 days.

(21) Appl. No.: 18/915,274

(22) Filed: Oct. 14, 2024

(65) Prior Publication Data
US 2025/0032360 A1 Jan. 30, 2025

Related U.S. Application Data

(63) Continuation of application No. 18/043,897, filed as application No. PCT/JP2021/032393 on Sep. 3, 2021, now Pat. No. 12,138,228.

(30) Foreign Application Priority Data

Sep. 3, 2020 (JP) ................................. 2020-148162
Aug. 30, 2021 (JP) ................................. 2021-139595

(51) Int. Cl.
A61J 3/00 (2006.01)
A61J 3/07 (2006.01)
(Continued)

(52) U.S. Cl.
CPC ................. A61J 3/074 (2013.01); B65B 1/30 (2013.01); B65B 5/103 (2013.01); G06T 7/0012 (2013.01); G06T 2207/30242 (2013.01)

(58) Field of Classification Search
CPC ......... B65B 1/03; B65B 5/103; G06T 7/0012; G06T 2207/30242; A61J 3/074
See application file for complete search history.

(56) References Cited

U.S. PATENT DOCUMENTS 11,753,193 B2 * 9/2023 Holmes ..................... B65B 9/02
  53/473
12,043,464 B2 * 7/2024 Schüttfort ............... B65B 61/26
(Continued)

FOREIGN PATENT DOCUMENTS

CN 109195567 A 1/2019
EP 2816346 A1 12/2014
(Continued)

OTHER PUBLICATIONS

International Search Report in PCT/JP2021/032393, mailed Sep. 28, 2021. 4pp.
(Continued)

Primary Examiner — Eyamindae C Jallow
(74) Attorney, Agent, or Firm — HAUPTMAN HAM, LLP

(57) ABSTRACT

A drug packaging device includes a drug accommodating/dispensing unit that supplies various types of drugs, a drug packaging portion in which a drug supplied from the drug accommodating/dispensing unit is packaged in a packaging sheet, a drug packaging introducing member that drops the drug to be packaged into the packaging sheet in the drug packaging portion), a pooling portion that pools, upstream of this drug packaging introducing member, the drug, and a drug imaging device that captures an image of the drug in the pooling portion. The drug imaging device performs an imaging process of capturing an image of the drug in the
(Continued)

pooling portion in a non-backlit state, and an imaging process of capturing an image of the drug in the pooling portion in a backlit state.

12 Claims, 20 Drawing Sheets

(51) Int. Cl.
*B65B 1/30* (2006.01)
*B65B 5/10* (2006.01)
*G06T 7/00* (2017.01)

(56) References Cited

U.S. PATENT DOCUMENTS

| 12,295,913 | B2 * | 5/2025 | Bochenko | B65B 3/003 |
| 2014/0318078 | A1 | 10/2014 | Kondo et al. | |
| 2016/0104282 | A1 | 4/2016 | Takahashi | |
| 2018/0312285 | A1 * | 11/2018 | Amano | B65H 59/36 |
| 2019/0201284 | A1 | 7/2019 | Koike et al. | |

FOREIGN PATENT DOCUMENTS

| JP | H11206853 | A | 8/1999 | | |
| JP | 2004290350 | A | 10/2004 | | |
| JP | 201086257 | A | 4/2010 | | |
| JP | 20152795 | A | 1/2015 | | |
| JP | 6232735 | B2 | 11/2017 | | |
| JP | 2017225832 | A | 12/2017 | | |
| WO | 2013105198 | A1 | 7/2013 | | |
| WO | 2015136598 | A1 | 9/2015 | | |
| WO | WO-2016152731 | A1 * | 9/2016 | | B65B 41/16 |
| WO | WO-2018025852 | A1 * | 2/2018 | | G07F 11/68 |
| WO | 2020045169 | A1 | 3/2020 | | |

OTHER PUBLICATIONS

Partial Supplementary European Search Report in EP Application No. 21864423.5, dated Feb. 21, 2024, 14pp.
Office Action in CN Application No. 202180055302.7, dated Feb. 22, 2025, 16pp.

* cited by examiner

DRUG IMAGING DEVICE AND DRUG PACKAGING DEVICE

RELATED APPLICATIONS

The present application is a continuation of U.S. patent application Ser. No. 18/043,897 filed on Mar. 2, 2023, which is a National Phase of International Application Number PCT/JP2021/032393 filed Sep. 3, 2021, which claims priority of Japanese Application Nos. 2020-148162 filed Sep. 3, 2020 and 2021-139595 filed Aug. 30, 2021, the disclosure of which applications are hereby incorporated by reference herein in their entirety.

TECHNICAL FIELD

This invention relates to a drug imaging device that captures an image of a drug, such as a tablet or a capsule, before packaging, and a drug packaging device that packages the drug for which the image was captured.

BACKGROUND ART

Patent Document 1 discloses a drug packaging device including a drug supply unit that supplies various types of drugs, a drug packaging portion in which a drug supplied from the drug supply unit is packaged in a packaging sheet, an introducing member that introduces the drug to be packaged into the packaging sheet in the drug packaging portion, and a drug checking unit that determines whether the drug is stuck to the introducing member on the basis of a captured image of the introducing member.

The drug checking unit includes a drug identification unit that rolls the drug in a drug rolling portion provided with a pair of rotating rollers and captures an image of the drug and determines embossing and printing on the drug, and a quantity determination unit that captures an image of the drug to be packaged and determines a drug quantity upstream of the introducing member.

Further, Patent Document 2 discloses a drug information acquisition device. In this drug information acquisition device, a bottom portion of an imaging tray for temporarily holding one dose of a drug is constituted by a row of V-shaped grooves. The drugs are loaded onto the imaging tray and the imaging tray is vibrated to eliminate overlap between the doses of drugs and correct the posture of the drugs using a first inclined surface and a second inclined surface of the V-shaped groove. Two cameras are disposed respectively facing the first inclined surface and the second inclined surface of the V-shaped groove.

CITATION LIST

Patent Literature

Patent Document 1: WO 2018/025852 A1
Patent Document 2: JP 2015-2795 A

SUMMARY OF INVENTION

Technical Problem

However, in the drug identification processes of the devices in the related art described above, an imaging location for capturing an image of the embossing or the like on the drug differs from an imaging location for determining the drug quantity. Thus, the structure of the device is complex and the drug imaging process takes time, which are problems. Further, in the devices in the related art described above, outer shape information of the drug is acquired by processing the image of the drug captured in a non-backlit state. As a result, it is difficult to accurately identify the outer shape information of a drug that, for example, is the same color as a background color.

This invention provides a drug imaging device and a drug packaging device configured to perform both imaging of embossing or the like on a drug and imaging for determining a drug quantity in a pooling portion for the drug, thereby shortening processing time of a drug imaging process, improving accuracy of determination of the drug quantity, and the like.

Solution to Problem

A drug imaging device according to this invention is a drug imaging device including an imaging unit configured to capture a still image of a drug. The imaging unit performs an imaging process of capturing, in a non-backlit state, an image of the drug in a pooling portion configured to temporarily pool the drugs before packaging, and an imaging process of capturing, in a backlit state, an image of the drug in the pooling portion.

With the configuration described above, the imaging process of capturing an image in the non-backlit state makes it possible to capture an image of embossing or the like applied to the drug to identify the drug in the pooling portion. Further, with a shadow image of the drug obtained by the imaging process of capturing an image in the backlit state, it is easy to count the drug quantity in the pooling portion. That is, since both imaging of embossing or the like on the drug and imaging for determining the drug quantity are performed in the pooling portion for the drugs, the processing time of the drug imaging process can be shortened and the accuracy of determining the drug quantity and the like can be improved.

The imaging unit may perform a first imaging process of capturing an image of the drug in the pooling portion from one side in the non-backlit state, a second imaging process of capturing an image of the drug in the pooling portion from the one side in the backlit state, and a third imaging process of capturing an image of the drug in the pooling portion from another side in the non-backlit state.

With the configuration described above, an image of embossing or the like on a drug positioned with the surface with embossing or the like facing upward, for example, can be captured by the first imaging process, and an image of the embossing or the like on a drug positioned with the surface with embossing or the like facing downward can be captured by the third imaging process. This makes it possible to identify a drug in the pooling portion on the basis of the images obtained by the first and third imaging processes, even for a drug with embossing or the like on one side only. Further, with the shadow images of the drugs obtained by the second imaging process, it is easy to count the drug quantity in the pooling portion.

The imaging unit may include a first camera configured to capture an image of the drug in the pooling portion from above, an upper illumination unit configured to illuminate the drug in the pooling portion from above, a second camera configured to capture an image of the drug in the pooling portion from below, and a lower illumination unit configured to illuminate the drug in the pooling portion from below.

Further, the imaging unit may include, on a lower side of a bottom surface of the pooling portion, a surface light-emitting member configured to switch between a surface light-emitting state and a transparent state, the first imaging process and the third imaging process may be performed in the transparent state of the surface light-emitting member, and the second imaging process may be performed in the surface light-emitting state of the surface light-emitting member.

The imaging unit may include, on a lower side of a bottom surface of the pooling portion, a light adjusting member configured to switch between a transparent state and a translucent state, the first imaging process and the third imaging process may be performed in the transparent state of the light adjusting member, and the second imaging process may be performed in the translucent state of the light adjusting member with the lower illumination unit turned on.

The imaging unit may perform each imaging process on an identical subject a plurality of times within a certain time period. Here, when an image is captured after waiting for a drug in a vibrating state or a rolling state to become still in the pooling portion, the time required for capturing an image of the drug increases. When, as described above, a plurality of images of the same subject are captured within a certain time period, since a plurality of images can be obtained, an image of the drug with the embossed surface or printed surface of the drug facing a camera direction is more likely to be obtained. Thus, the recognition rate of embossing or the like can be improved.

Further, a drug packaging device according to this invention may include a drug supply unit configured to supply various types of drugs, a drug packaging portion configured to package the drugs supplied from the drug supply unit in a packaging sheet, the drug imaging device described above including a plurality of the pooling portions configured to temporarily pool, upstream of the drug packaging portion, the drugs supplied from the drug supply unit, and an image output unit configured to output an image captured by the drug imaging device.

With the configuration described above, an inspector can visually recognize the drugs in the pooling portions by the images captured by the drug imaging device, making it possible to appropriately check the drugs in the drug packet.

Further, a drug packaging device according to this invention may include a drug supply unit configured to supply various types of drugs, a drug packaging portion configured to package the drugs supplied from the drug supply unit in a packaging sheet, the drug imaging device described above including a plurality of the pooling portions configured to temporarily pool, upstream of the drug packaging portion, the drugs supplied from the drug supply unit, and a determination unit configured to determine a drug quantity and drug information in each of the plurality of pooling portions on the basis of an image captured by the drug imaging device.

With the configuration described above, the determination unit can automatically determine the drug quantity and the drug information in the pooling portions when the drugs are packaged.

The drug packaging device may further include a third camera configured to capture an image of an inside of each of the plurality of pooling portions at a position where the drugs pooled in the pooling portion are delivered to the drug packaging portion. With this configuration, the imaging by the third camera can uncover a drug stuck to the pooling portion and, when such a drug is found, a user can be notified that the packaged drug may not match a prescription.

The drug packaging device described above may further include a drug-receiving plate including a rotating plate portion rotationally driven about an axis and including, on an identical circumference about the axis, a plurality of opening portions to which the drugs from the drug supply unit are supplied, a drug-receiving bottom portion including a portion configured to function as a bottom portion of the plurality of opening portions and a packaging opening provided at a specific location in a region in which the plurality of opening portions move by rotation of the rotating plate portion, and a cleaning member provided in a portion on a bottom surface side of the rotating plate portion where the plurality of opening portions are not formed, and configured to clean a top of the drug-receiving bottom portion by rotation of the rotating plate portion. The plurality of pooling portions are constituted by the plurality of opening portions, and the portion configured to function as the bottom portion of the plurality of opening portions.

According to this, drug powder on the drug-receiving bottom portion is removed by the cleaning member, making it possible to save the user from the trouble of cleaning the top of the drug-receiving bottom portion. Then, cleaning is performed by the cleaning member, solving a problem of improper illumination caused by the drug powder in the pooling portion, a problem of misidentification of a lump of the drug powder as a single drug, and the like.

Advantageous Effects of Invention

According to the present invention, since both imaging of embossing or the like on a drug and imaging for determining a drug quantity are performed in a pooling portion for the drug, the effects of shortening processing time of a drug imaging process, improving accuracy of determining a drug quantity, and the like are achieved.

BRIEF DESCRIPTION OF DRAWINGS

FIG. 22 is an explanatory view illustrating an arrangement location of a second light-emitting unit and the like.

FIG. 23 is an explanatory view illustrating an arrangement location of a third light-emitting unit and the like.

DESCRIPTION OF EMBODIMENTS

Embodiments of this invention will be described below with reference to the accompanying drawings.

Figure 1:
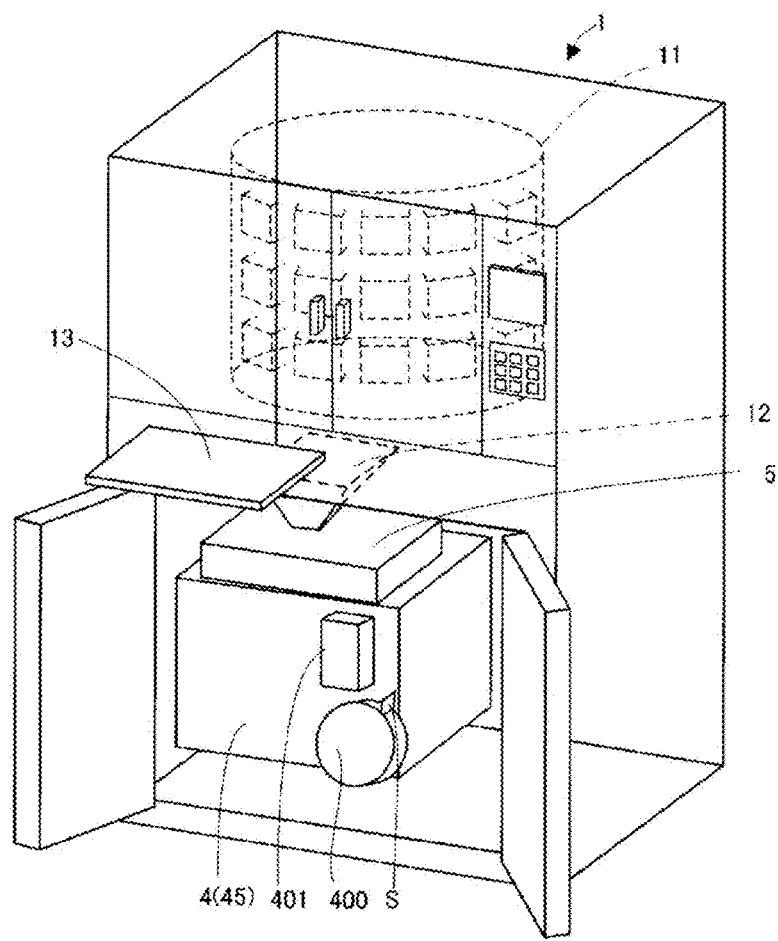
FIG. 1 is an explanatory view illustrating a schematic configuration of a drug packaging device according to an embodiment of this invention.

As illustrated in FIG. 1, a drug packaging device 1 of this embodiment includes a drug accommodating/dispensing unit 11 that is a drug supply unit configured to accommodate drugs by type and dispense the drugs one packet portion at a time according to packaging data created on the basis of prescription information, a drug guide portion 12 that receives the drugs, a drug pooling unit 5 that temporarily pools the drugs, a drug imaging device 6 of this embodiment that captures a still image of the drugs supplied to the drug pooling unit 5, and a packaging unit 4 mounted with a packaging sheet roll 400 and an ink ribbon cassette 401 and configured to perform printing on a packaging sheet S supplied from the packaging sheet roll 400 and package the drugs having passed through the drug pooling unit 5 using the packaging sheet S one packet portion at a time. A printing mechanism including the ink ribbon cassette is not necessarily required. The drug accommodating/dispensing unit 11 includes a drug cassette that accommodates various kinds of drugs, and a universal cassette that can accommodate a drug unsuitable for accommodation in the cassette. Specifically, the drug cassette is a dedicated cassette prepared for each drug. Each drug cassette has a drug dispensing path with a size corresponding to the shape and size of the corresponding drug. The universal cassette is a general-purpose cassette that can dispense drugs of various shapes and sizes. The size of the drug dispensing path and driving conditions of the universal cassette are adjustable as necessary. Further, the prescription information usually includes, for example, a drug type and quantity. However, information related to a mark (information on the presence of a mark, an outer shape of the mark, etc.), the size, the shape, and the color of the drug can be acquired with reference to a drug master table (described below) based on the drug type.

Further, the drug packaging device 1 includes a manual distribution portion 13. The manual distribution portion 13 includes cells disposed in a lattice pattern so that a drug can be put into each cell. For example, in a case in which one day's worth of a drug is prescribed for morning, afternoon, and evening, the drug is put into three cells.

The drugs dispensed from the drug accommodating/dispensing unit 11 and the drugs manually distributed by the manual distribution portion 13 pass through the drug guide portion 12 and the like and reach the drug pooling unit 5. The drug imaging device 6 captures still images of the drugs in the drug pooling unit 5, and the drugs are subsequently packaged in a packaging sheet by the packaging unit 4. That is, in this embodiment, one packet portion of the drugs is discharged by a joint operation between the drug accommodating/dispensing unit 11 and the manual distribution portion 13. Paths through which the drugs discharged from the drug accommodating/dispensing unit 11 and the manual distribution portion 13 reach the drug pooling unit 5 will be described below with reference to FIG. 4 and the like.

Figure 2:
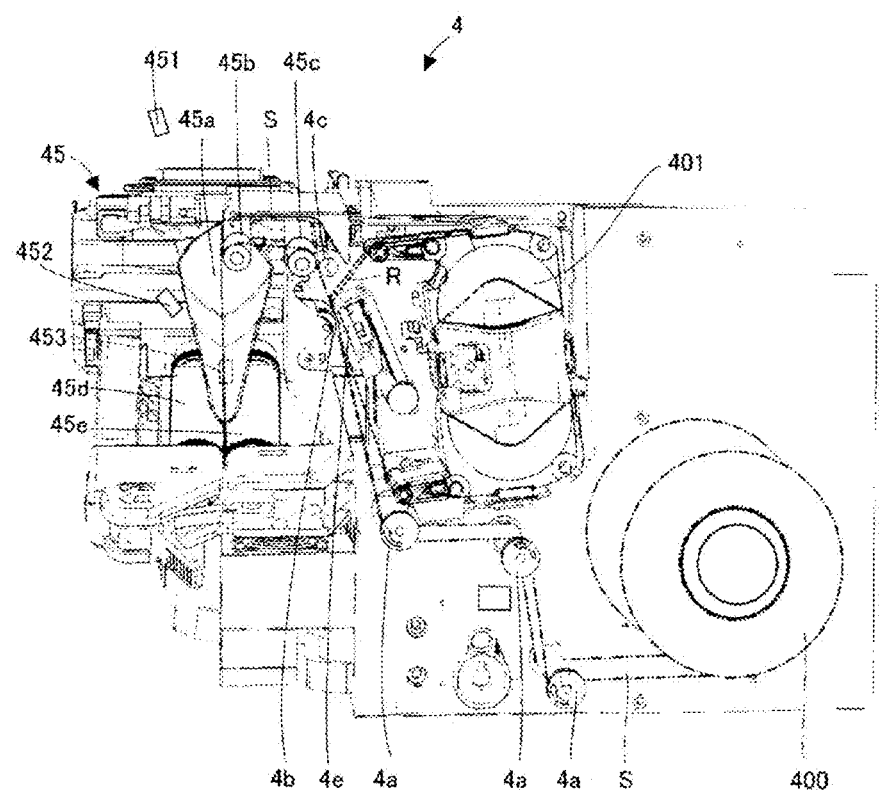
FIG. 2 is an explanatory view illustrating a packaging unit of the drug packaging device of FIG. 1.

FIG. 2 is a drawing illustrating an example of the packaging unit 4 in a state where the packaging sheet roll 400 and the ink ribbon cassette 401 are mounted. FIG. 2 also illustrates a drug packaging portion 45 of the packaging unit 4. For example, the drug packaging portion 45 introduces a drug into the packaging sheet S folded in half from an opening of the packaging sheet S, and thermally fuses the packaging sheet S to enclose the introduced drug.

The packaging sheet S is, for example, passed over three guide shafts 4a, between a backup roller 4b and a printing head 4e, and over a guide shaft 4c. Further, an ink ribbon R accommodated in the ink ribbon cassette 401 is guided by a tape guide of the packaging unit 4, passed between the backup roller 4b and the printing head 4e, separated from the packaging sheet S after printing, and returned to inside the ink ribbon cassette 401.

Further, as illustrated in FIG. 2, curved guide rollers 45b, 45c that are freely rotatable and cause the transport direction of the packaging sheet S to curve immediately before an unfolding guide 45a of the drug packaging portion 45 are disposed at, for example, positions near the guide shaft 4c that guides the packaging sheet S (downstream in a transport direction of the packaging sheet S). The packaging sheet S folded in half is opened by being passed over a guide surface (front surface) of the unfolding guide 45a. On a non-guide surface (back surface) side of the unfolding guide 45a, that is, above the location where the packaging sheet S is opened, a drug packaging introducing member 7 (refer to FIG. 3A and the like) for introducing the drug into the packaging sheet S is provided.

A lower side of the drug packaging introducing member 7 has a narrow shape. As described above, when the packaging sheet S folded in half passes over the guide surface of the unfolding guide 45a, the packaging sheet S is opened. Thus, an opening, which is an opened portion of the packaging sheet S, is formed at a position near a lower end of the drug packaging introducing member 7. The opening of the packaging sheet S is a location where a drug dropped from the drug packaging introducing member 7 is received.

Further, the drug packaging portion 45 includes a heat sealing member (e.g., a pair of heater rollers 45d, 45e) downstream of the unfolding guide 45a in the transport direction of the packaging sheet S. Furthermore, a feed roller (not illustrated) is provided downstream of the heater rollers 45d, 45e in the transport direction of the packaging sheet S. These heater rollers 45d, 45e are rotationally driven by a driving mechanism (not illustrated) including a motor, a linear gear, and an intermittent gear. With the heater rollers 45d, 45e, the packaging sheet S can be caused to travel at a predetermined speed. Further, with the heater rollers 45d, 45e, the opening of the packaging sheet S is closed, the packaging sheet S is sealed in a short-side direction of the packaging sheet S, and one packet portion of the drugs inserted into the opening is individually packaged.

Figure 3A:
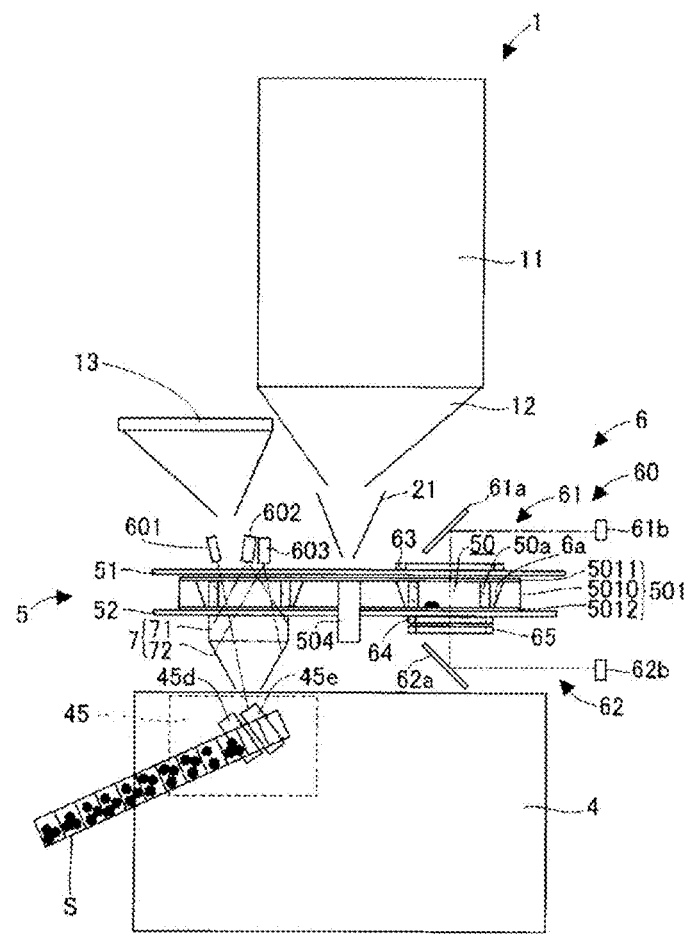
FIG. 3A is an explanatory view illustrating a schematic configuration of the drug packaging device of FIG. 1.

FIG. 3A illustrates a schematic configuration of the entire drug packaging device 1. The drug pooling unit 5 and the drug imaging device 6 are positioned between the drug accommodating/dispensing unit 11 and the packaging unit 4.

The drug pooling unit 5 includes an upper plate portion 51 and a lower plate portion 52. The drug pooling unit 5 also includes a drug-receiving plate portion 501 in a space between the upper plate portion 51 and the lower plate portion 52. The drug-receiving plate portion 501 includes a rotating plate portion 5010 having a disk shape, an upper plate 5011 fixed to an upper surface side of the rotating plate portion 5010, and a drug-receiving bottom portion 5012 positioned on a lower surface side of the rotating plate portion 5010 and not fixed to the rotating plate portion 5010.

Figure 4:
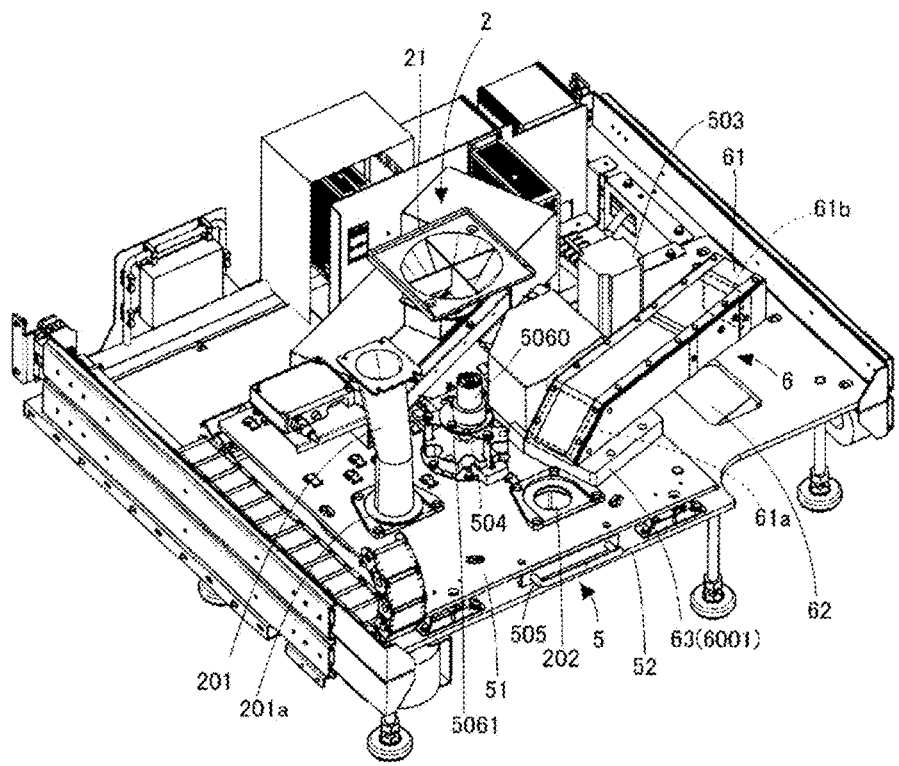
FIG. 4 is a perspective view illustrating a drug pooling unit and a drug imaging device of the drug packaging device of FIG. 1.
Figure 5:
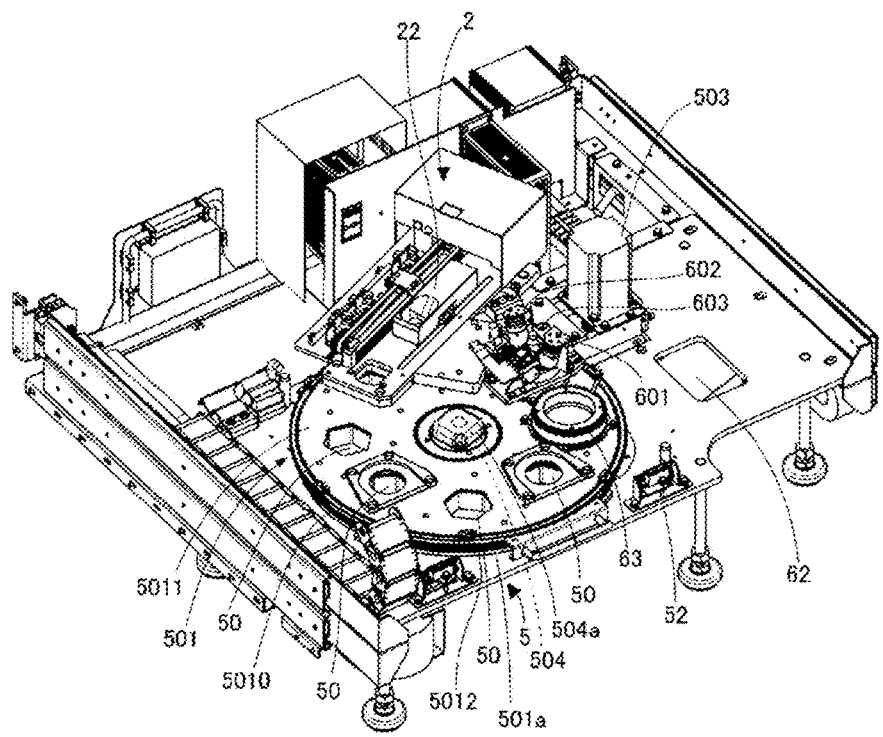
FIG. 5 is a perspective view of FIG. 4 with a first camera and other components omitted.

As illustrated in FIG. 4, components such as a drug transfer unit 2 and a first camera 61 are attached to an upper surface portion of the upper plate portion 51. As illustrated in FIG. 5 as well, the rotating plate portion 5010 and the upper plate 5011 of the drug-receiving plate portion 501 are rotatable about a shaft 504 in a horizontal plane on an upper surface side of the lower plate portion 52 (in the space). Note that the drug-receiving bottom portion 5012 is mounted on the lower plate portion 52 in a non-rotatable manner, and is detachably attached to the lower plate portion 52. For example, a protruding portion protruding upward is provided on the lower plate portion 52, and rotation of the drug-receiving bottom portion 5012 is disabled when a recessed portion 5012d (refer to FIG. 10) on an outer periphery of the drug-receiving bottom portion 5012 engages with the protruding portion. A motor 503 or the like is attached to an upper surface portion of the lower plate portion 52. Furthermore, components such as the drug packaging introducing member 7 and a second camera 62 are attached to a lower surface side of the lower plate portion 52.

Figure 6:
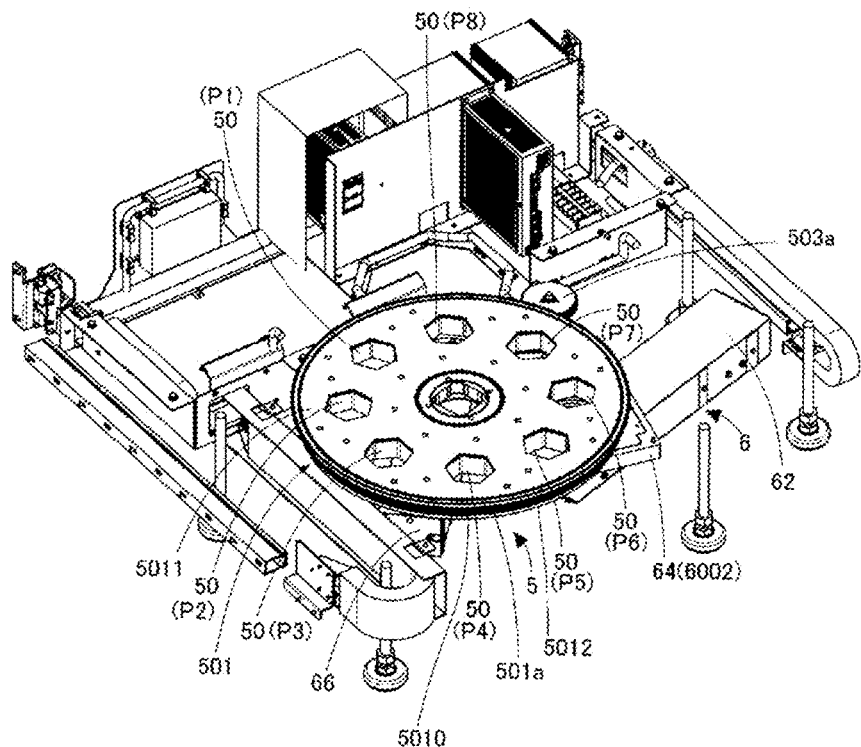
FIG. 6 is a perspective view of FIG. 5 with a remaining drug detection camera and other components omitted.

As illustrated in FIG. 6 as well, a gear portion 501a is formed on an outer peripheral surface of the rotating plate portion 5010 of the drug-receiving plate portion 501, and a gear 503a is meshed with the gear portion 501a. When the gear 503a is driven by the motor 503, the rotating plate portion 5010 is rotated. Further, by the driving control of the motor 503, the rotating plate portion 5010 can be intermittently rotated in a forward direction by predetermined angles. Furthermore, by the driving control of the motor 503, the rotating plate portion 5010 is rotated forward and backward. Overlap between drugs in a pooling portion 50 can be eliminated by rotating the rotating plate portion 5010 forward and backward.

The drug-receiving plate portion 501 including the rotating plate portion 5010 and the drug-receiving bottom portion 5012 includes, for example, eight of the pooling portions 50. Each pooling portion 50 temporarily pools the drugs before the drugs are packaged. The eight pooling portions 50 are positioned at regular intervals on the same circumference about the shaft 504. The drug supplied to each pooling portion 50 is supported by the drug-receiving bottom portion 5012. The rotating plate portion 5010 is detachable from the drug-receiving bottom portion 5012.

Figure 7:
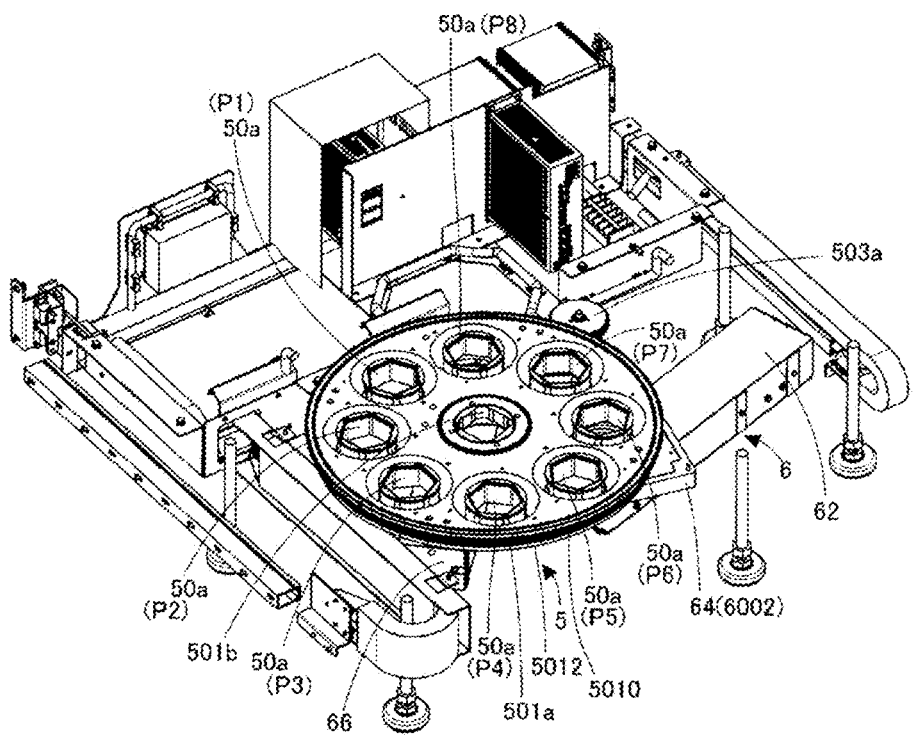
FIG. 7 is a perspective view of FIG. 6 with an upper plate of a drug-receiving plate portion omitted.
Figure 8:
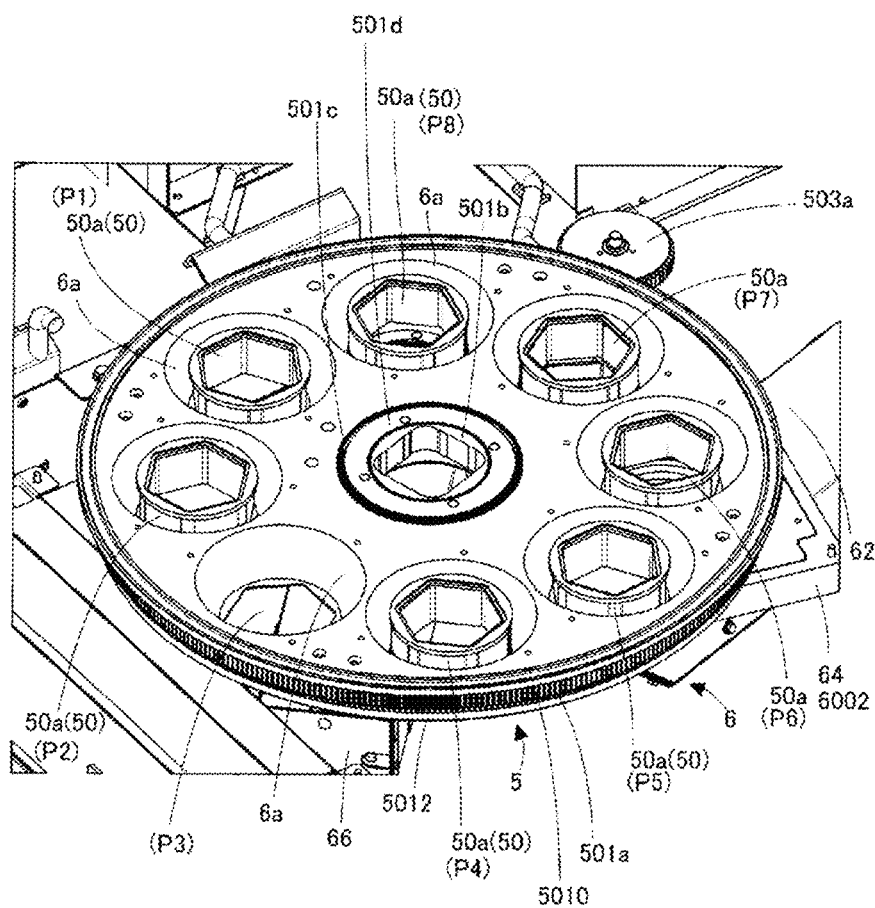
FIG. 8 is an enlarged perspective view illustrating the drug-receiving plate portion of FIG. 7.

As illustrated in FIG. 7 and FIG. 8, each pooling portion 50 includes a cylindrical portion (opening portion) 50a made of a transparent material (e.g., a resin) that transmits light, and a portion of the drug-receiving bottom portion 5012 that functions as a bottom portion of the cylindrical portion 50a, and the drugs are pooled inside the cylindrical portion 50a. The drug-receiving bottom portion 5012 is disposed horizontally, and a direction perpendicular thereto is a vertical direction. An imaging optical axis of each of the cameras 61, 62, 66 described below extends in the vertical direction toward the portion of the drug-receiving bottom portion 5012 that functions as the bottom portion of the cylindrical portion (opening portion) 50a. Further, an inclined mirror portion 6a forming a mirror surface having a truncated cone-shape with sides separating upward from the outer peripheral surface of the cylindrical portion 50a is formed on a peripheral side of the cylindrical portion 50a.

The cylindrical portion 50a is positioned at the center of the inclined mirror portion 6a. A lower end of the inclined mirror portion 6a is in contact with an outer peripheral portion of a lower end of the cylindrical portion 50a. Note that an upper end surface of the cylindrical portion 50a is processed into a frosted glass surface (fine uneven surface) or a non-light-transmitting surface. Further, in the upper plate 5011, a polygonal opening having the same shape as the shape of the cylindrical portion 50a in a plan view is formed at a location where the cylindrical portion 50a is positioned. The drugs can reach the inside of the cylindrical portion 50a through the polygonal opening. Further, the upper plate 5011 is either entirely transparent or transparent in at least a portion on an upper side of the inclined mirror portion 6a.

An inner shape of the cylindrical portion 50a is a polygonal tubular shape composed of a plurality of flat surfaces, and is, for example, a hexagonal shape in a plan view of the cylindrical portion 50a. An outer shape of the cylindrical portion 50a is circular. Further, at the inclined mirror portion 6a, light from above is reflected toward the cylindrical portion 50a. Thus, the drugs in the cylindrical portion 50a can be illuminated with side light (light in a direction intersecting the imaging optical axis of the camera 61). When a large amount of side light is present, suitable images of the embossing on the drugs can be captured. Note that, instead of the inclined mirror portion 6a, a light-emitting element that emits light toward a side surface of the cylindrical portion 50a may be provided on the outer peripheral side of the cylindrical portion 50a.

Figure 9A:
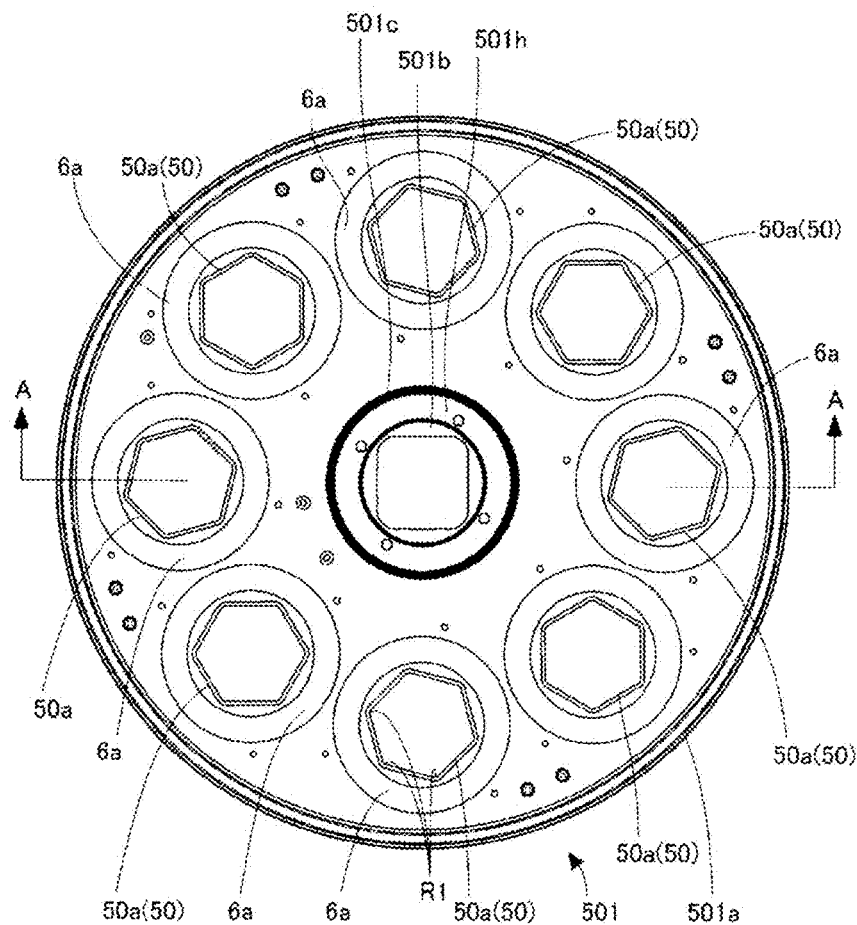
FIG. 9A is a plan view of the drug-receiving plate portion with the upper plate omitted.
Figure 9B:
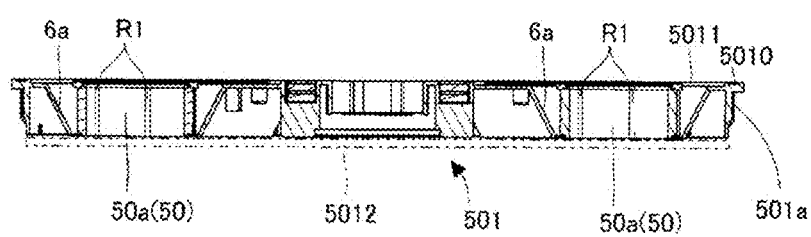
FIG. 9B is a cross-sectional view taken along line A-A with the upper plate disposed.

Further, as illustrated in FIG. 9A and FIG. 9B, connection points R1 between adjacent surfaces of the six surfaces of the cylindrical portion 50a of the pooling portion 50 are each formed into a curved surface (R) shape. The lower edge of the inner shape of the cylindrical portion 50a forms, for example, an opening portion having a hexagonal shape in a plan view.

Figure 10:
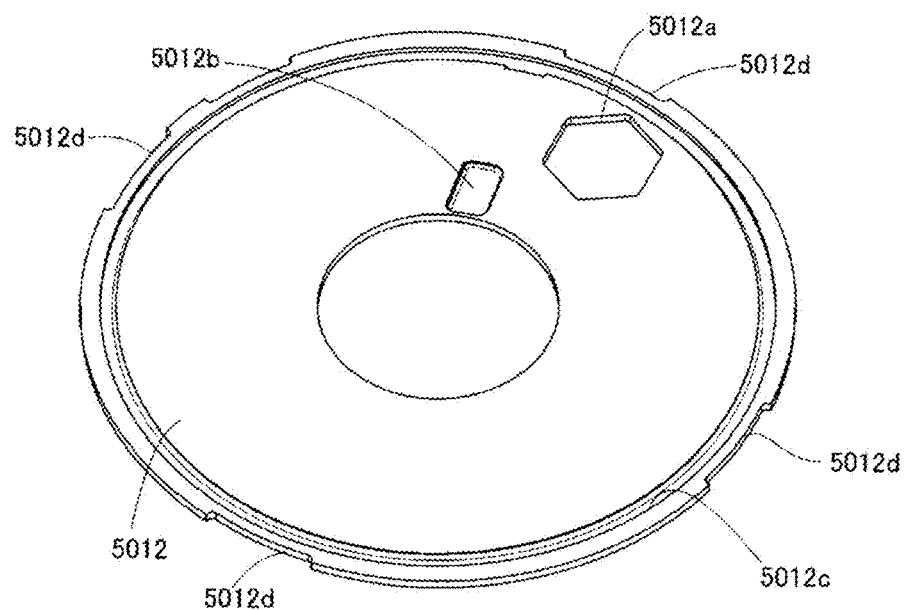
FIG. 10 is a perspective view illustrating a drug-receiving bottom portion positioned below the drug-receiving plate portion.

The drug-receiving bottom portion 5012 is made of a transparent material (e.g., a resin) that transmits light. Further, as illustrated in FIG. 10, a packaging opening 5012a is formed in a predetermined position of the drug-receiving bottom portion 5012. Since the drug packaging introducing member 7 is positioned below the packaging opening 5012a, when the cylindrical portion 50a of the pooling portion 50 is positioned above the packaging opening 5012a, the drugs in the pooling portion 50 fall into the drug packaging introducing member 7 and reach the inside of the packaging sheet S. That is, the packaging opening 5012a is positioned at a specific location in a region in which the cylindrical portion (opening portion) 50a is moved by the rotation of the rotating plate portion 5010. Note that, similarly, an opening is also formed in the lower plate portion 52 at a position corresponding to the packaging opening 5012a.

As illustrated in FIG. 6 and FIG. 7, when the rotating plate portion 5010 of the drug-receiving plate portion 501 rotates on the drug-receiving bottom portion 5012, each pooling portion 50 sequentially moves to a first drug-receiving position P1, a second drug-receiving position P2, a third drug-receiving position P3, a non-processing position P4, a fourth drug-receiving position P5, a drug imaging position P6, a drug discharging position P7 (packaging position) where the packaging opening 5012a is formed, and a remaining drug confirmation position P8. Note that a plurality of wheels 56 (refer to FIG. 11) are attached to a lower surface of the rotating plate portion 5010. With this configuration, a certain gap can be maintained between an upper surface of the drug-receiving bottom portion 5012 and a bottom surface of the rotating plate portion 5010 to prevent sliding contact between these surfaces while the drug-receiving bottom portion 5012 is subject to the load of the rotating plate portion 5010. Due to this gap, adverse effects on the rotation of the rotating plate portion 5010 caused by drug powder (drug waste) of the drug or the like are reduced, making it possible to reduce cleaning frequency. Note that a drug powder collection groove 5012c (refer to FIG. 10) is formed in the drug-receiving bottom portion 5012 at a position inward of an outer peripheral end of the drug-receiving bottom portion 5012.

At the first drug-receiving position P1, a drug transferred by the drug transfer unit 2 falls into the pooling portion 50 positioned at the position P1. The drug transfer unit 2 includes a hopper 21 positioned below the drug guide portion 12 and above the remaining drug confirmation position P8. The drug transfer unit 2 further includes a belt-driven transfer unit 22. The transfer unit 22 is positioned across an area from a lower portion of the hopper 21 to the first drug-receiving position P1, and transfers the drug received from the hopper 21 to inside of the pooling portion 50 at the first drug-receiving position P1. Note that providing an ionizer that emits ions toward the inside of the hopper 21 can eliminate or reduce sticking of a drug to the inside of the hopper 21 due to static electricity.

A drug is supplied from another drug supply unit to the second drug-receiving position P2.

At the third drug-receiving position P3, a drug supplied from a universal cassette (not illustrated) is supplied to the inside of the pooling portion 50 positioned at the position P3 through a guide cylinder 201 and a supply opening portion 201a. The universal cassette can supply drugs of any shape and automatically discharges drugs instead of performing a manual distribution process for the drugs. Note that, as described above, the drug accommodating/dispensing unit 11 includes a plurality of cassettes, some of which are universal cassettes. Note that providing an ionizer that emits ions toward the inside of the guide cylinder 201 can eliminate or reduce sticking of a drug to the inside of the guide cylinder 201 and to the pooling portion 50 due to static electricity.

At the fourth drug-receiving position P5, drugs supplied from the manual distribution portion 13 are supplied to the inside of the pooling portion 50 positioned at the position P5 through a hopper (not illustrated) and a supply opening portion 202.

At the drug imaging position P6, the drugs (e.g., a plurality of drugs in one packet portion) are temporarily pooled in the pooling portion 50 positioned at the position P6. The drug imaging device 6 is positioned in the vicinity of the drug imaging position P6.

The drug imaging device 6 includes an imaging unit 60 configured to capture a still image of a subject. In this embodiment, the imaging unit 60 includes the first camera 61 that captures a color image of the drugs in the pooling portion 50 positioned at the drug imaging position P6 from above, the second camera 62 that captures a color image of the drugs in the pooling portion 50 from below, an upper illumination unit 63 that illuminates the drugs in the pooling portion 50 from above, the inclined mirror portion 6a (may be a light-emitting element instead of the inclined mirror portion 6a) that illuminates the drugs in the pooling portion 50 from the side, and a lower illumination unit 64 that illuminates the drugs in the pooling portion 50 from below.

An area around a light entry port of the first camera 61 is in contact with an outer surface of a housing 6001 of the upper illumination unit 63. Furthermore, a sealing member (e.g., an O-ring) is disposed at this point of contact. The sealing member prevents dust and the like from entering the housing 6001 from the first camera 61 side.

Further, the imaging unit 60 of the drug imaging device 6 includes a surface light-emitting member 65 below the lower illumination unit 64. Note that a portion of the lower plate portion 52 corresponding to the drug imaging position P6 is transparent or is an opening. The surface light-emitting member 65 has, for example, a square shape and can be switched between a surface light-emitting state and a transparent state. In the surface light-emitting state, imaging of the drugs is backlit imaging performed by the first camera 61. The surface light-emitting member 65 is composed of, for example, a transparent light-guiding plate having a rectangular shape and a light-emitting element (e.g., a light-emitting diode (LED)) that emits light toward an edge portion of the transparent light-guiding plate. The surface light-emitting member 65 is in the transparent state when the light-emitting element is not turned on. The surface light-emitting member 65 may be positioned above the lower illumination unit 64.

The lower illumination unit 64 and the surface light-emitting member 65 are disposed in a housing 6002. An area around a light entry port of the second camera 62 is in contact with an outer surface of the housing 6002. Furthermore, a sealing member (e.g., an O-ring) is disposed at this point of contact. The sealing member prevents dust and the like from entering the housing 6002 from the second camera 62 side.

Figure 13:
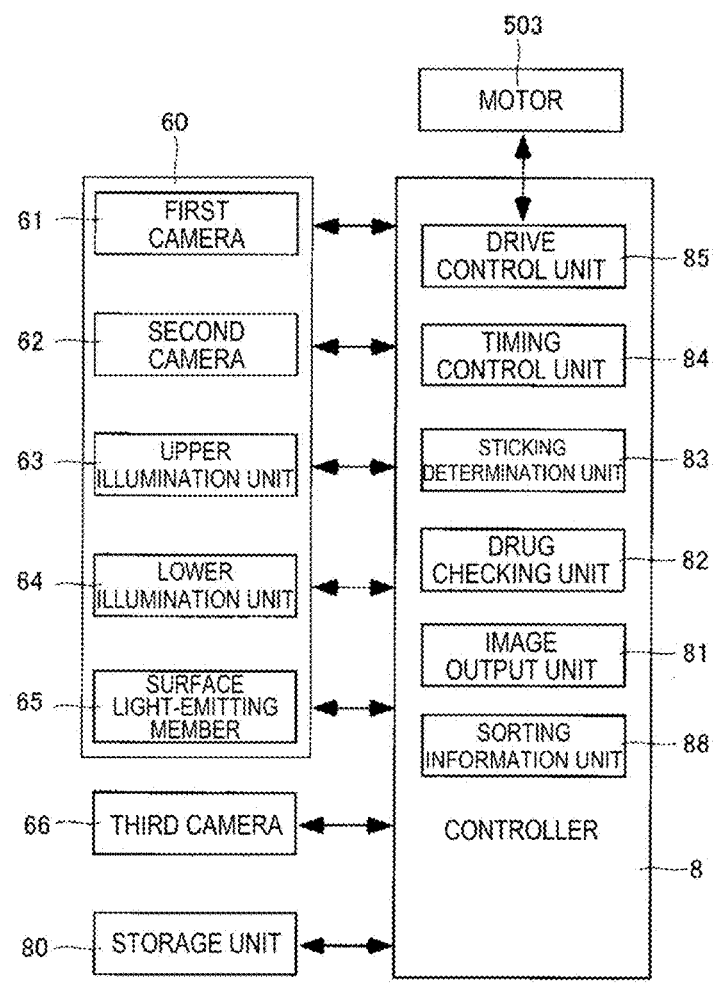
FIG. 13 is a schematic block diagram illustrating a portion of a control system of the drug packaging device of FIG. 1.

By the control of a controller 8 illustrated in FIG. 13, the imaging unit 60 performs a first imaging process of turning on the upper illumination unit 63 and capturing an image of the drugs in the pooling portion 50 from above in a non-backlit state (with any one of direct light, side light, and a mixture of direct light and side light) using the first camera 61, a second imaging process of turning on the surface light-emitting member 65 and capturing an image of the drugs in the pooling portion 50 from above in a backlit state using the first camera 61, and a third imaging process of turning on the lower illumination unit 64 and capturing an image of the drugs in the pooling portion 50 from below in a non-backlit state (with any one of direct light, side light, and a mixture of direct light and side light) using the second camera 62.

Combinations of the imaging processes and the turn-on processes described above are shown in Table 1 below.

TABLE 1

| Imaging process | First imaging process | Second imaging process | Third imaging process |
| --- | --- | --- | --- |
| Imaging direction | Imaging from above | Backlit imaging from above | Imaging from below |
| Upper illumination unit | ON | OFF | OFF |
| Surface light-emitting member | Transparent | Emitting light | Transparent |
| Lower illumination unit | OFF | OFF | ON |

With the second imaging process, an image of the drugs in the pooling portion 50 is captured in a backlit state, thereby obtaining an image in which a bottom side of the pooling portion 50 is bright and the drugs are dark. That is, the quantity of the drugs can be determined by counting the number of drug shadows (dark regions) in the captured image.

The first camera 61 on the upper side is positioned above the drug imaging position P6. Further, the first camera 61 on the upper side includes a mirror 61a at which the image of the inside of the pooling portion 50 is reflected in a lateral direction, an imaging element (e.g., charge-coupled device (CCD) or complementary metal oxide semiconductor (CMOS)) 61b that receives light of the image reflected at the mirror 61a, and various lenses that focus the image onto the imaging element 61b.

The second camera 62 on the lower side is positioned below the drug imaging position P6. The second camera 62 on the lower side includes a mirror 62a at which the image of the inside of the pooling portion 50 is reflected in the lateral direction, an imaging element (e.g., CCD or CMOS) 62b that receives the image reflected at the mirror 62a, and various lenses that focus the image onto the imaging element 62b.

The upper illumination unit 63 is composed of a large number of light-emitting elements (e.g., LEDs) arranged in a circular pattern, and has a transparent or hollow structure at a central portion through which light is transmitted. The light-emitting elements arranged in a circular pattern are positioned outward of the cylindrical portion 50a of the pooling portion 50 and above the inclined mirror portion 6a. Light emitted from the upper illumination unit 63 is reflected in the lateral direction at the inclined mirror portion 6a and guided into the pooling portion 50 (cylindrical portion 50a) in a side light state. Further, some of the light emitted from the upper illumination unit 63 reaches an inner side of the cylindrical portion 50a of the pooling portion 50 as direct light to the first camera 61.

When the light enters the cylindrical portion 50a from the upper end surface of the cylindrical portion 50a, the light exits from an inner peripheral surface of the cylindrical portion 50a, and a bright pattern is formed on the bottom (portion of the drug-receiving bottom portion 5012) of the cylindrical portion 50a. When the upper end surface of the cylindrical portion 50a is processed into a frosted glass surface (fine uneven surface) or a non-light-transmitting surface, the formation of the bright pattern can be suppressed. This makes it possible to suppress a phenomenon where the bright pattern is included in the captured image, and suppress adverse effects on drug identification. Note that when the lower end surface of the cylindrical portion 50a is also processed in the same manner, this suppresses transmission of the illumination light from below through the cylindrical portion 50a.

A gap from 0.5 mm to 1.5 mm may be formed between the lower end surface of the cylindrical portion 50a and the drug-receiving bottom portion 5012. When such a gap is formed, the fewer shadows of drugs close to the inner surface of the cylindrical portion 50a in the captured image are likely to be present.

As described above, the connection points R1 between the surface portions of the cylindrical portion 50a of the pooling portion 50 that form the hexagonal shape each have a curved surface (R) shape. Here, in a structure in which the connection points R1 between the surface portions do not each have a curved surface shape, light from the outside is refracted at the connection points R1 between the surface portions, and illumination unevenness occurs at the bottom surface of the pooling portion 50. When the connection points R1 of the cylindrical portion 50a each have a curved surface shape, the curved surface shape causes the light to be diffused toward the cylindrical portion 50a, making illumination unevenness less likely to occur. The curved surface shape portions preferably have the same thickness as other portions. Note that overlap between the drugs in the pooling portion 50 is more easily eliminated when the inner surface of the cylindrical portion 50a has a polygonal shape.

The lower illumination unit 64 includes a large number of light-emitting elements (e.g., LEDs) arranged in a circular pattern at positions outward of the inner periphery of the cylindrical portion 50a, relative to the inside of the cylindrical portion 50a positioned at the drug imaging position P6, so as not to obstruct during backlit imaging, and has a transparent or hollow structure at a central portion through which light is transmitted. An emission optical axis of the light-emitting element is not limited to a straight upward direction. The emission optical axis of the light-emitting element may face a direction toward the center of the bottom of the pooling portion 50, for example.

Further, the first, second, and third imaging processes described above may be performed a plurality of times (e.g., five times) within a certain time period. In particular, a time interval between the first imaging process and the third imaging process is, for example, preferably within a certain time period. Further, by increasing a shutter speed during the first and the third imaging, blurring of the captured images of the drugs can be suppressed. Here, immediately after the rotating plate portion 5010 of the drug-receiving plate portion 501 is intermittently rotated and the pooling portion 50 is stopped at the drug imaging position P6, the drugs in the pooling portion 50 are in a vibrating state or a rolling state. In a case in which the process waits for this vibrating state or rolling state to subside, the time required to capture an image of the drugs increases.

When, as described above, a plurality of images of the same subject are captured within a certain time period, since a plurality of images can be obtained, an image of the drug with the embossed surface or printed surface of the drug facing the camera direction is more likely to be obtained. Thus, the recognition rate of the embossing or the like can be improved. Further, when the time interval between the first imaging process and the third imaging process is a certain time period, the position of a drug in the first imaging process and the position of the same drug in the third imaging process are likely to be the same. Thus, whether a drug is the same drug in both images can be determined from the correspondence between the drug positions in the image captured from above by the first imaging process and in the image captured from below by the third imaging process within the certain time period.

Note that a drug checking unit (determination unit) 82 may employ, for example, an image having the largest number of drug shadows (dark regions) among the plurality of images obtained in the second imaging process, determine the drug quantity on the basis of this employed image, and determine whether the necessary number of drugs is present in the pooling portion 50 by comparing this determined quantity with a drug quantity indicated by the prescription information (packaging data). Alternatively, an image having the largest total area of drug shadows (dark regions) may be employed. Further, the drug checking unit 82 may be configured to select images obtained in the first and third imaging processes at time points closest to the imaging time point of the employed image as images for determining the types of the drugs. Note that, desirably, the second imaging process is performed after the rotating plate portion 5010 of the drug-receiving plate portion 501 is intermittently rotated and before the pooling portion 50 stops at the drug imaging position P6. Since the drugs sometimes overlap each other after the pooling portion 50 stops, desirably, the second process is performed as described above.

In a case in which the drug checking unit 82 does not determine that the drug quantity and the drug information described below are correct with reference to packaging data (feature data described below) for the drugs in the pooling portion 50 positioned at the drug imaging position P6, the controller 8 may rotate the rotating plate portion 5010 of the drug-receiving plate portion 501 forward and backward to roll the drugs in the pooling portion 50, and perform the first, second, and third imaging processes again. Alternatively, as an error process, an alert may be output.

On the other hand, in a case in which the drug checking unit 82 determines that the quantity and the drug information described below for the drugs in the pooling portion 50 positioned at the drug imaging position P6 are correct with reference to the packaging data (feature data described below), the controller 8 may rotate the rotating plate portion 5010 of the drug-receiving plate portion 501 by 45 degrees to move the pooling portion 50 at the drug imaging position P6 to the drug discharging position P7 (packaging position) at which the packaging opening 5012*a* is formed. Thus, the drugs in the pooling portion 50 pass from the packaging opening 5012*a* through the drug packaging introducing member 7 and reach the packaging sheet S.

A first remaining drug detection camera 601, a second remaining drug detection camera 602, and a third remaining drug detection camera 603 are positioned above the drug discharging position P7 (packaging position). Further, an illumination unit composed of an LED or the like and configured to illuminate an imaging range of each remaining drug detection camera is provided. Note that sensors may be used instead of the remaining drug detection cameras 601, 602, 603.

The first remaining drug detection camera 601 captures an image of the inside of the opening of the packaging sheet S from the packaging opening 5012*a*. According to this imaging, an image of the inside of the opening of the packaging sheet S can be captured from the packaging opening 5012*a*, and as a result, whether a drug (drug that needed to be packaged earlier) or foreign matter is present in the opening of the packaging sheet S can be automatically checked or checked by visual confirmation of the image by an inspector.

Further, the second remaining drug detection camera 602 captures an image of a relay portion 71 in the drug packaging introducing member 7. According to this imaging result, whether a drug is stuck in the relay portion 71 of the drug packaging introducing member 7 can be automatically checked or visually checked by the inspector.

Further, the third remaining drug detection camera 603 captures an image of a final portion of the drug packaging introducing member 7 (lower portion of a chute portion 72 positioned below the relay portion 71). According to this imaging result, whether a drug is stuck in the final portion of the drug packaging introducing member 7 can be automatically checked or visually checked by the inspector.

As illustrated in FIG. 2, the illumination unit includes a first light-emitting unit 451, a second light-emitting unit 452, and a third light-emitting unit 453.

The first light-emitting unit 451 illuminates the inside of the drug packaging introducing member 7 from a position above the drug discharging position P7. Note that some of the light emitted from the first light-emitting unit 451 exits from an opening in a lower portion of the drug packaging introducing member 7 and reaches the vicinity of a position between the heater roller 45*d* and the heater roller 45*e*, without being blocked by the drug packaging introducing member 7.

Figure 22:
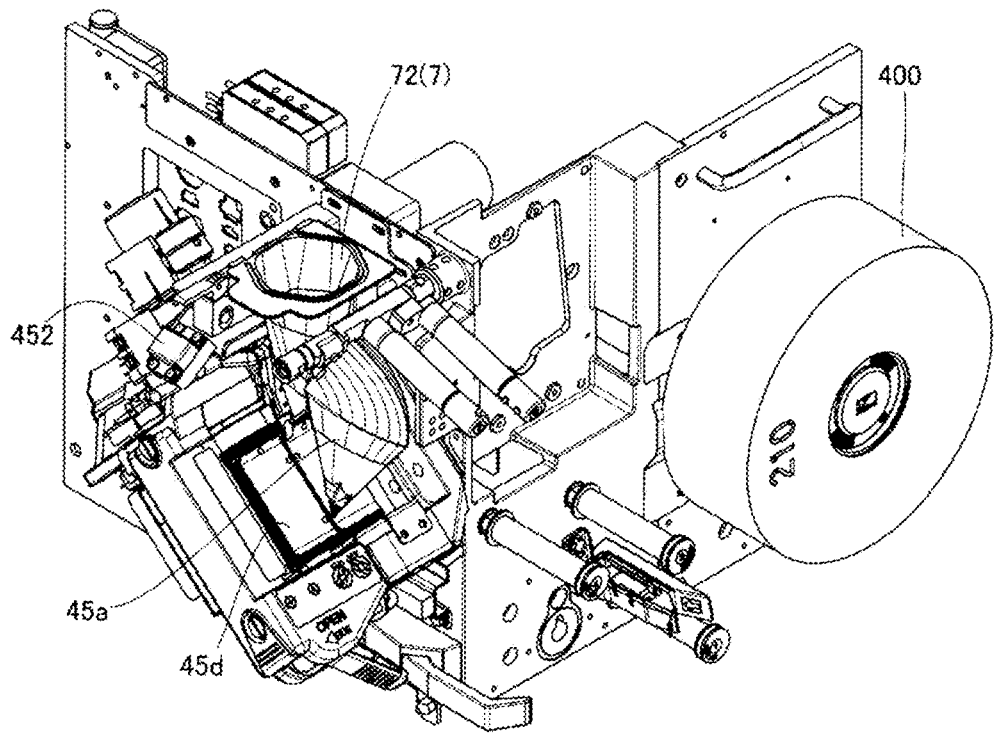

As illustrated in FIG. 22 as well, the second light-emitting unit 452 illuminates the vicinity of a position between the heater roller 45*d* and the heater roller 45*e* from a position on a lateral side of the drug packaging introducing member 7. The light emitted from the second light-emitting unit 452 passes through the packaging sheet S and reaches the inside of the opening of the packaging sheet S opened by the guide surface (front surface) of the unfolding guide 45*a*.

Figure 23:
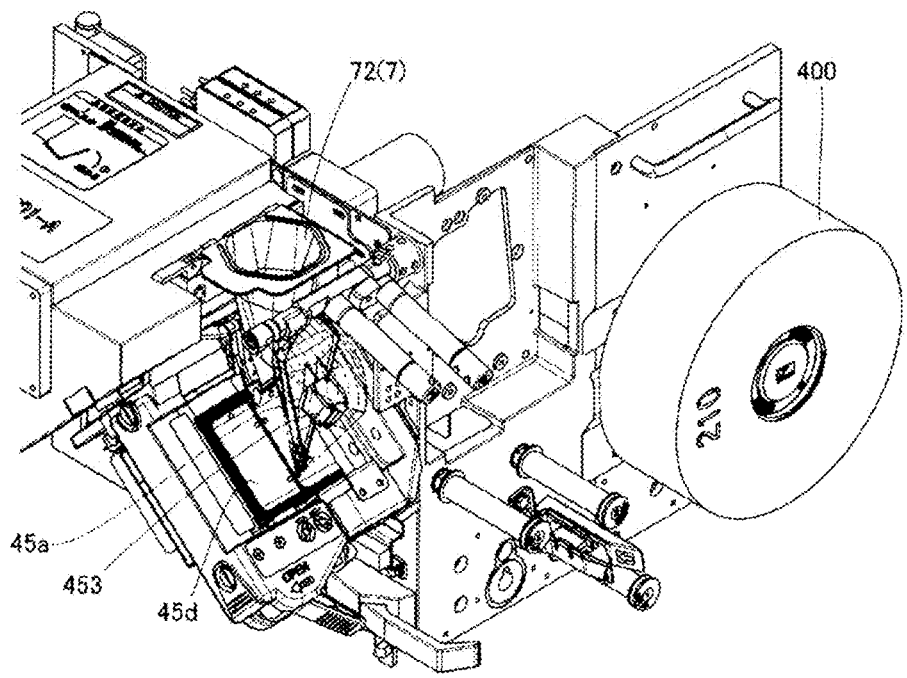
Figure 24:
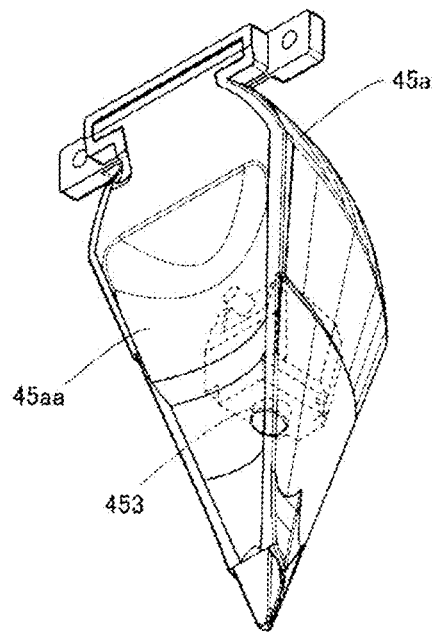
FIG. 24 is an explanatory view illustrating an unfolding guide and the third light-emitting unit disposed in the unfolding guide.

As illustrated in FIG. 23 and FIG. 24 as well, the third light-emitting unit 453 is provided in a recessed portion of the non-guide surface (back surface) of the unfolding guide 45*a*, and illuminates the vicinity of a position between the heater roller 45*d* and the heater roller 45*e*, similarly to the second light-emitting unit 452. The light emitted from the third light-emitting unit 453 reaches the inside of the opening of the packaging sheet S without passing through the packaging sheet S. A cover 45*aa* that is transparent and covers the third light-emitting unit 453 is attached to an open side of the recessed portion of the unfolding guide 45*a* so that drug powder or the like does not fall onto the third light-emitting unit 453. Since the third light-emitting unit 453 can be positioned near the opening of the packaging sheet S folded in half, the inside of the opening of the packaging sheet S can be brightly illuminated. Note that an electric wire connected to the third light-emitting unit 453 is led out of the recessed portion through, for example, an area between the unfolding guide 45*a* and the cover 45*aa*.

A brightness (amount of light) of each of the first light-emitting unit 451, the second light-emitting unit 452, and the third light-emitting unit 453 may be adjustable by a dimmer. Further, the third light-emitting unit 453 is not limited to being positioned in the recessed portion of the non-guide surface (back surface) of the unfolding guide 45*a*. The third light-emitting unit 453 itself may enter through the opening of the packaging sheet S and be positioned in the opening to illuminate the inside of the opening. Such a third light-emitting unit 453 is supported by, for example, a support member having a thin rod shape or a wire shape, enters through the opening of the packaging sheet S, and is positioned inside the opening. The support source may be the non-guide surface (back surface) of the unfolding guide 45*a* or a tip end portion of the chute portion 72.

Note that, in the example described above, the three remaining drug detection cameras 601, 602, 603 are disposed above the drug discharging position P7 (packaging position), but the embodiment is not limited to such a configuration. The drug packaging introducing member 7 may be provided entirely or partially movable in the lateral direction or another direction, and an image of the inside of the drug packaging introducing member 7 after movement may be captured by the remaining drug detection camera disposed at the location to which the drug packaging introducing member 7 moves. With this configuration, the number of remaining drug detection cameras disposed on the pooling portion 50 can be reduced, and complexities of structure due to a dense arrangement of the cameras on the pooling portion 50 can be avoided.

Figure 25:
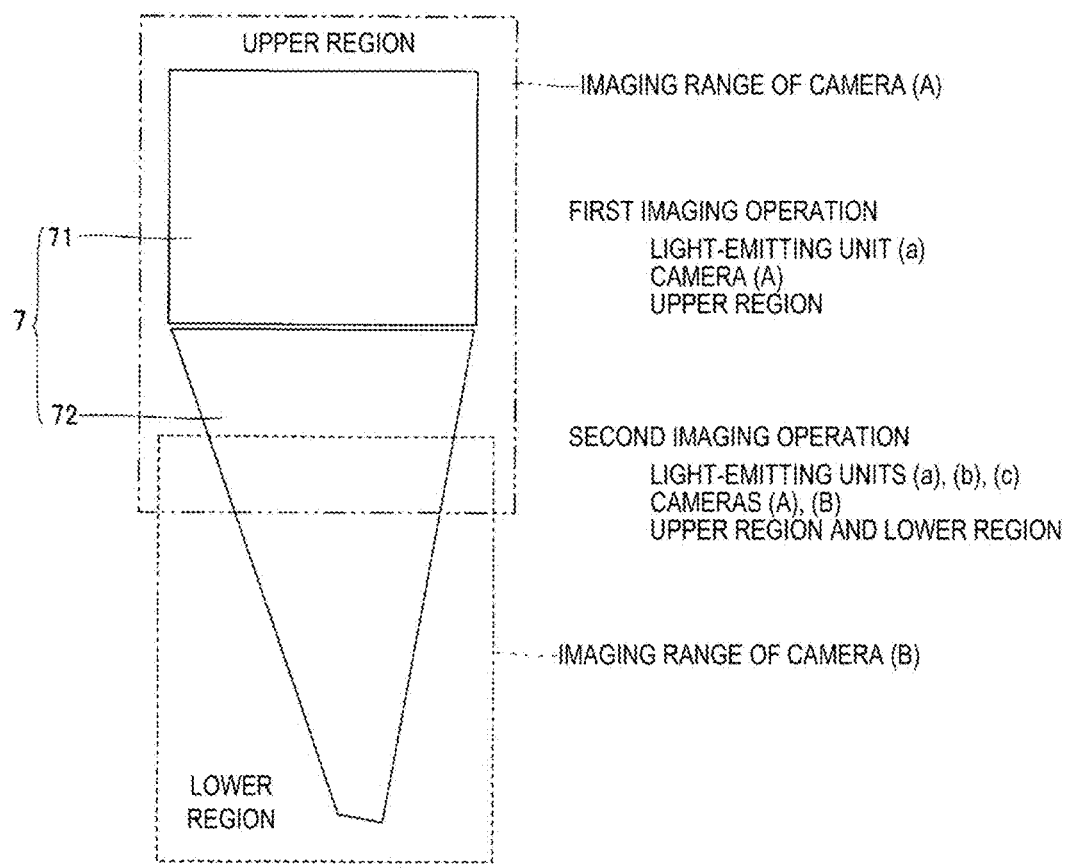
FIG. 25 is an explanatory view illustrating a configuration example in which remaining drugs in a drug packaging introducing member and in a packaging sheet are detected by two remaining drug detection cameras.

Alternatively, a configuration may be adopted in which two remaining drug detection cameras (A), (B) are disposed above the drug discharging position P7 (packaging position). In this configuration, as illustrated in FIG. 25, the remaining drug detection camera (A) has a deep depth of field and captures an image of a region (hereinafter referred to as an upper region) from the relay portion 71 to a substantially intermediate position of the chute portion 72 in the drug packaging introducing member 7. The remaining drug detection camera (B) also has a deep depth of field and captures an image of a region (hereinafter referred to as a lower region) from the substantially intermediate position of the chute portion 72 of the drug packaging introducing member 7 to the inside of the opening in the packaging sheet S. Note that the imaging ranges of the two remaining drug detection cameras (A), (B) overlap each other at the substantially intermediate position of the chute portion 72.

Even in the configuration including the two remaining drug detection cameras (A), (B), desirably, the illumination unit includes three light-emitting units (a), (b), (c). For example, the light-emitting unit (a) is disposed near the installation position of the remaining drug detection camera, the light-emitting unit (b) is disposed in the packaging unit 4 (desirably, in the drug packaging portion 45), and the light-emitting unit (c) is disposed on the non-guide surface (back surface) side of the unfolding guide 45*a*.

In an example of control in the configuration including the two remaining drug detection cameras (A), (B), an image of the upper region is captured by the remaining drug detection camera (A) with only the light-emitting unit (a) turned on (first imaging operation). That is, in the first imaging operation, the upper region of an inner wall surface of the drug packaging introducing member 7 is set as the imaging range, and the first imaging operation is used for determining whether a drug is stuck to the inner wall surface.

On the other hand, in a state in which all the light-emitting units (a), (b), (c) are turned on, images of the upper region and the lower region are captured by the remaining drug detection cameras (A), (B) (second imaging operation). That is, in the second imaging operation, the entire inner wall surface of the drug packaging introducing member 7 and the inside of the opening of the packaging sheet S are set as the imaging ranges and, upon determination that at least one drug is present on the entire inner wall surface of the drug packaging introducing member 7 and the inside of the opening of the packaging sheet S at a stage where the drugs to be packaged have not yet started dropping into the opening of the packaging sheet S, a determination is made that a drug remains. In the second imaging operation, since not only the light-emitting unit (a) but also the light-emitting units (b), (c) are caused to emit light, the total amount of light is increased, making it possible to illuminate the inside of the opening of the packaging sheet S from multiple directions. Thus, detection of even one drug inside the opening of the packaging sheet S can be accurately performed. Note that a mode may also be adopted in which the light-emitting unit (a) is not caused to emit light in the second imaging operation.

Figure 26:
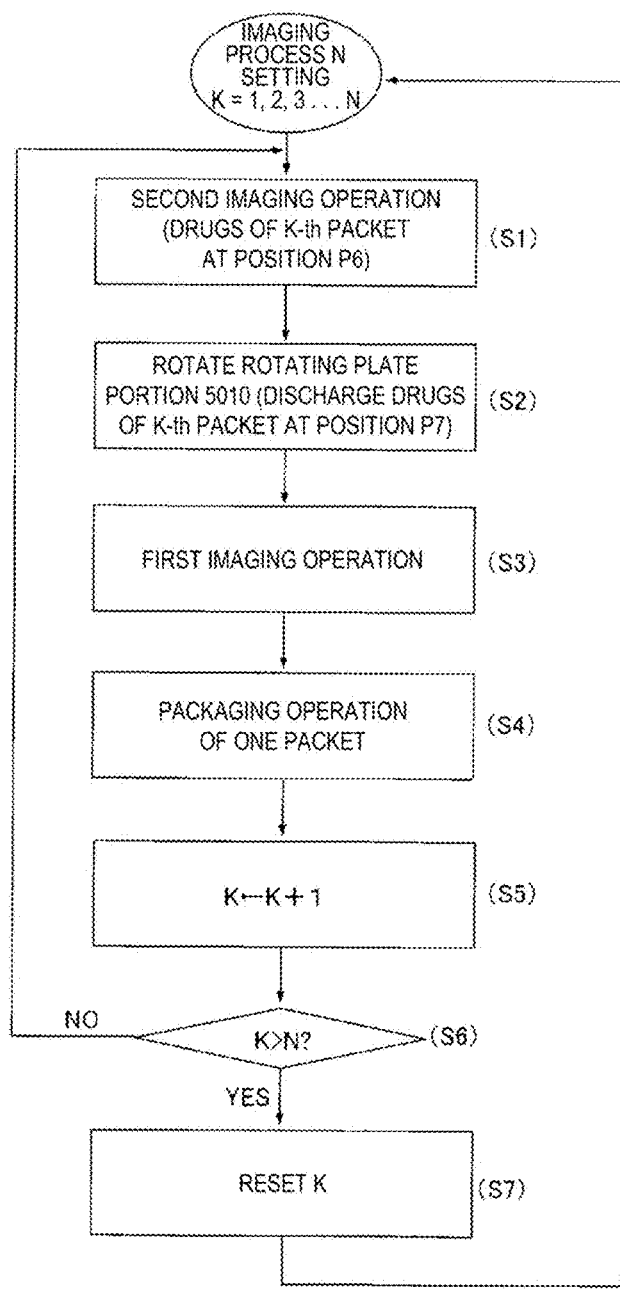
FIG. 26 is a flowchart illustrating an overview of an imaging operation and a packaging operation of the configuration example illustrated in FIG. 25.

As illustrated in the flowchart of FIG. 26, the second imaging operation is performed in a state where drugs of a K-th packet (where K is a natural number having a maximum value equivalent to a set packet count N) is positioned at the drug imaging position P6 (S1). In the case of K=1, information can be acquired about whether a remaining drug in a drug packet based on another prescription previously issued at the drug discharging position P7 remains inside the opening of the packaging sheet S of the current prescription. For K=2 and thereafter, information can be acquired about whether a drug that needs to be packaged in the current prescription remains inside the opening of the packaging sheet S of a subsequent packet. Note that, if generating several empty packets between different prescriptions, the second imaging operation when K=1 may be omitted.

After the second imaging operation, when the rotating plate portion 5010 rotates 45 degrees, the drug of the K-th packet according to the current prescription is dropped from the drug discharging position P7 and passes through the drug packaging introducing member 7 and into the opening of the packaging sheet S (S2). An image of the state of this dropping is captured by the first imaging operation (S3). That is, an image of the upper region is captured by the remaining drug detection camera (A) with only the light-emitting unit (a) turned on.

Note that the remaining drug detection imaging of the drug of the K-th packet of the current prescription starts from the first imaging operation (S3). Further, when the first imaging operation results in a determination where the drug is not stuck to the inner wall of the drug packaging introducing member 7, and the K-th packet is packaged in a state where some of the drugs to be packaged have moved to the position of the subsequent (K+1)-th packet while the packet corresponding to the drug of the K-th packet is being packaged, a remaining drug inside the opening of the packaging sheet S is detected in the subsequent second imaging operation.

After the first imaging operation, the packaging operation for one packet is performed (S4). Next, K is incremented (S5), and whether K exceeds N is determined (S6). In a case where K does not exceed N, the process proceeds to the second imaging operation of the subsequent packet of drugs (S1). In a case where K exceeds N, K is reset (S7) and the imaging process for the packets of the next prescription is performed.

Figure 12:
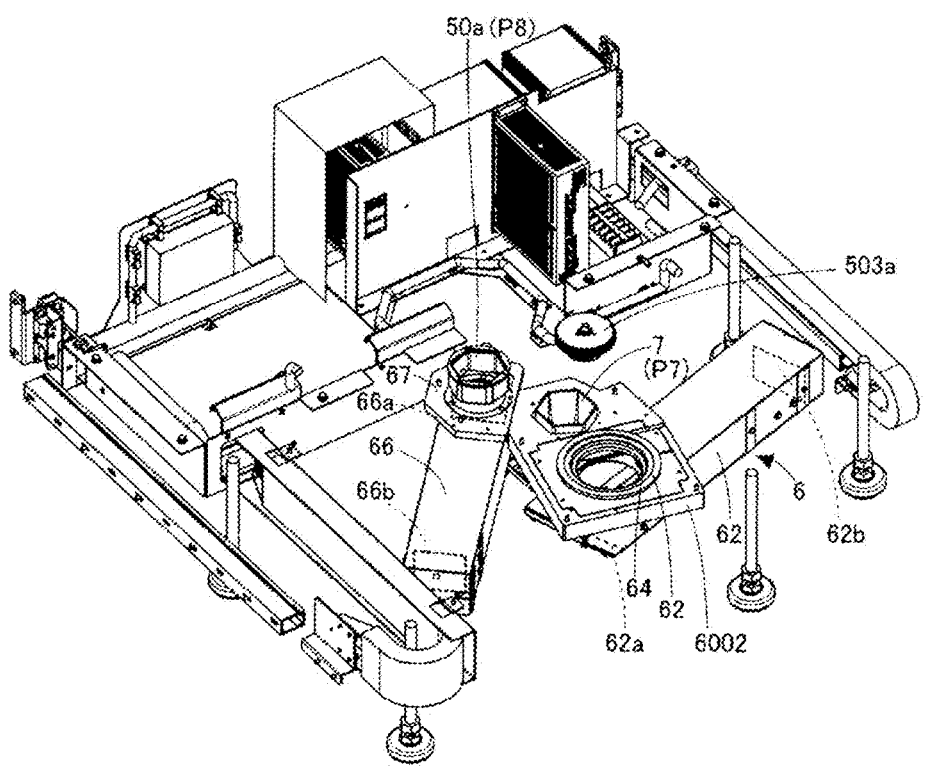
FIG. 12 is a perspective view of FIG. 6 with the drug-receiving plate portion omitted.

As illustrated in FIG. 12, the third camera 66 is positioned below the remaining drug confirmation position P8. The third camera 66 captures an image of the inside of the pooling portion 50 that has moved to the remaining drug confirmation position P8 after the drugs pooled in the pooling portion 50 are delivered to the drug packaging portion 45. For example, the third camera 66 includes a mirror 66*a* at which the image of the inner peripheral surface of the cylindrical portion 50*a* of the pooling portion 50 positioned at the remaining drug confirmation position P8 is reflected in a lateral direction, an imaging element (e.g., CCD or CMOS) 66*b* that receives the image reflected by the mirror 66*a*, and various lenses that focus the image onto the imaging element 66*b*. Further, a lower illumination unit 67 is provided at a position above the mirror 66*a*. Based on the imaging result of the third camera 66, whether drugs remain on the inner wall surface and in an inner space of the cylindrical portion 50*a* can be confirmed automatically or visually with an image by an inspector.

Note that the printing mechanism including the ink ribbon cassette 401 prints text such as a patient name and morning/afternoon/evening in a stage prior to drug packaging. Thus, even if an error is determined in a drug identification process or an automatic inspection, information of the error cannot be printed on the packaging sheet portion of the corresponding drug already packaged. Therefore, for example, a post-printing portion where error information such as a mark indicating a defect or a number indicating an insufficient drug count is printed on a packaging sheet portion that has already passed through the heater rollers 45*d*, 45*e* and undergone drug packaging may be provided.

Note that, when presenting a print layout on the packaging sheet to a user, a method of confirming the print layout via a monitor or the like of the drug packaging device 1 and a method of confirming the print layout on the basis of a packaging sheet on which printing was actually performed can be used. Preferably, the latter confirmation method does not involve a drug supply operation.

FIG. 13 is a schematic block diagram of a control system of the drug packaging device 1. A storage unit 80 connected to the controller 8 of the drug packaging device 1 stores a so-called master table (database of drugs and the like), prescription information of each patient, image data captured by the first, second, and third cameras 61, 62, 66 and the first, second, and third remaining drug detection cameras 601, 602, 603, and the like. Further, the first, second, and third cameras 61, 62, 66 and the first, second, and third remaining drug detection cameras 601, 602, 603 are controlled by the controller 8 in terms of operation timings of illumination and imaging and the like.

An image output unit 81 of the controller 8 performs a process of storing the images captured by the first to third cameras 61, 62, 66 and the like in the storage unit 80. Further, the image output unit 81 can read a captured image or the like from the storage unit 80 and display the captured image or the like on the monitor as an inspection support image. The inspector can inspect the drugs in the pooling portion 50 by viewing the inspection support image displayed on the monitor.

Figure 14:
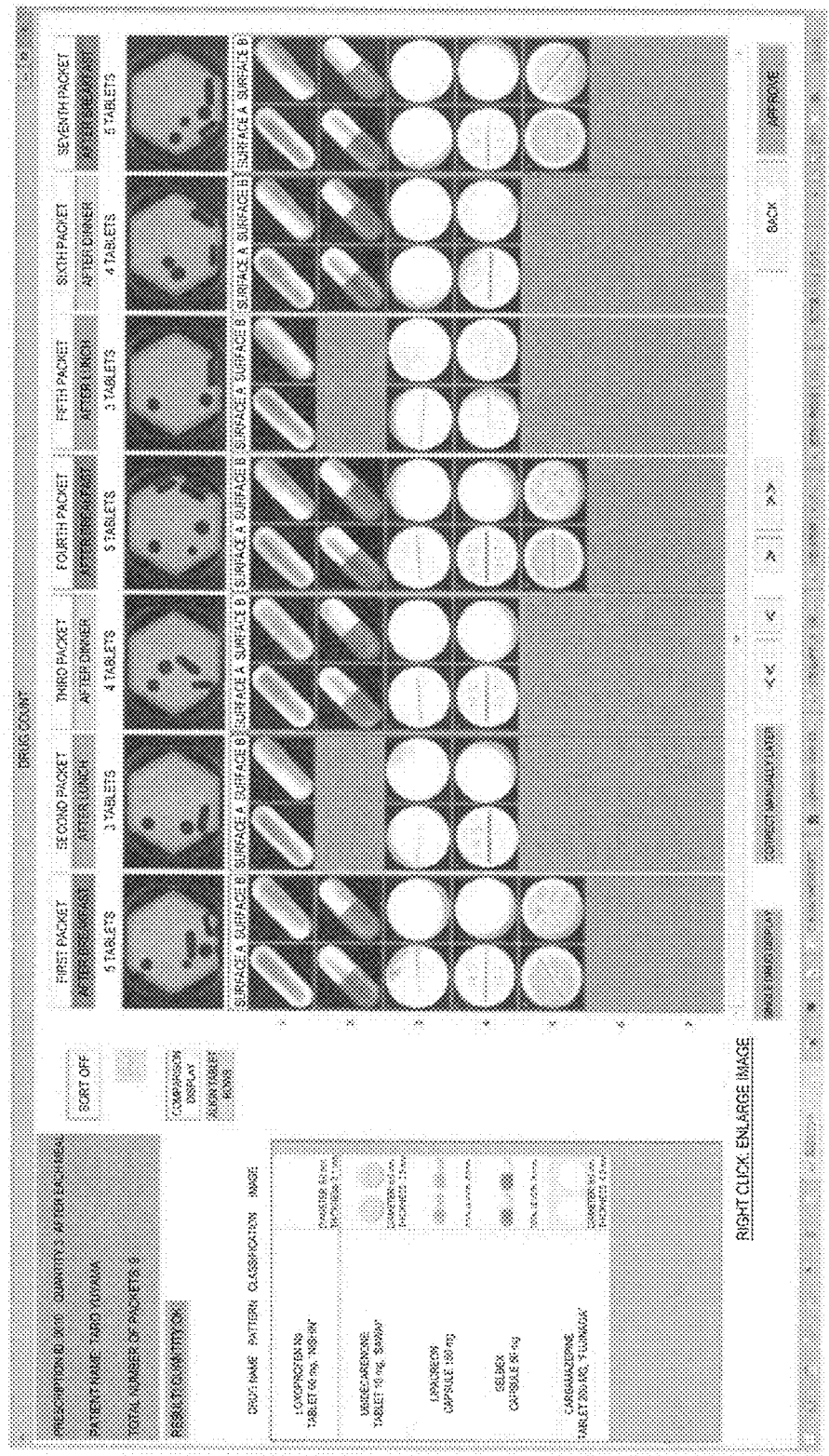
FIG. 14 is an explanatory view illustrating an example of an inspection support image of the drug packaging device of FIG. 1.

The inspection support image may be, for example, displayed on the monitor through association between an upper image of the drug captured by the first camera 61 and a lower image of the drug captured by the second camera 62 as front and back images, respectively, for each drug presumed to be the same drug, by processing by the controller 8. The front and back images are associated with each other by arranging the images horizontally or vertically. Further, whether the drugs are the same can be estimated from a correspondence relationship between the drug positions in the image captured from above and the image captured from below by the first and third imaging processes within the certain time period. Furthermore, the front and back images may be associated for all of the plurality of images or for a specific captured image among the plurality of images. The specific captured image may be an image in which embossing or the like is recognized by the drug checking unit 82. FIG. 14 illustrates an example of the inspection support image. This image displays patient information, information about the drugs to be administered to the patient (drug names and drug images), and front and back images of each drug obtained by cutting out individual drug image portions from a full image of the pooling portion interior captured for each packet.

Further, in addition to the captured images of the drugs in the pooling portion 50, the inspection support image may also include an image in which, among reference images of the drugs stored in the storage unit 80 in advance, reference images of the drugs to be packaged are arranged side by side. The reference images may be images captured under an imaging environment of the drug packaging device 1, images captured in a pharmacist room in which the drug packaging device 1 is installed, or images provided by a drug manufacturer.

The drug checking unit 82 of the controller 8 determines the number of drugs present in the pooling portion 50 positioned at the drug imaging position P6 on the basis of an image captured by the first camera 61. Since the first camera 61 captures an image of the shadows of the drugs due to the backlight, the drug checking unit 82, for example, counts the number of dark regions each having a predetermined size (area) or greater in the captured image and outputs this number of regions as the number of drugs. The dark regions include both a circular region and an annular region. Note that the predetermined size can be made different for each drug on the basis of data of the sizes of each drug stored in the storage unit 80.

Further, serving as a determination unit, the drug checking unit 82 can determine a drug by recognizing a mark such as embossing being drug information of the drug in the captured images captured in the first imaging process and the third imaging process. Furthermore, the drug checking unit 82 can automatically determine whether the drug specified by the prescription information (packaging data) is present in the pooling portion 50 by determining whether the specified drug matches the markings of the drug indicated by the prescription information (packaging data) in the storage unit 80 (drug master table).

Further, serving as a determination unit, the drug checking unit 82 determines other drug information (area (size) of the drug in a plan view, shape of the drug in a plan view, entire or partial surface color of the drug) indicating features of each drug acquired by the imaging. The drug checking unit 82 can also automatically determine whether the drug specified by the prescription information (packaging data) is present in the pooling portion 50 by determining a degree of coincidence between the drug information and the feature data of each drug (area (size) of the drug in a plan view, shape of the drug in a plan view, entire or partial surface color of the drug) indicated by the prescription information (packaging data) in the storage unit 80 (drug master table).

Further, the drug checking unit 82 can automatically determine whether the drug specified by the prescription information (packaging data) is present in the pooling portion 50 by image matching in which a captured image of the drug (drug information) and a reference image of each drug (feature data of each drug) stored in advance in the storage unit 80 are compared to determine the degree of coincidence. The reference image (for image matching) used by the drug checking unit 82 need not be the same as the reference image (for visual recognition) of the inspection support image described above.

A sticking determination unit 83 of the controller 8 determines factors such as sticking of a drug to the inner wall of the drug packaging introducing member 7 and sticking of a drug to the inner wall of the cylindrical portion 50*a* of the pooling portion 50, on the basis of the images captured by the first, second, and third remaining drug detection cameras 601, 602, 603 and the image captured by the third camera 66. For example, the sticking determination unit 83 determines sticking of a drug to the inner wall surface of the cylindrical portion 50*a* by comparing an image, captured by the third camera 66, of the cylindrical portion 50*a* of the pooling portion 50 positioned at the remaining drug confirmation position P8 with a basic image of a state in which a drug is not stuck to the inner wall surface.

The basic image is, for example, an image captured just before the first packaging process of the day, and this image is stored in the storage unit 80. Further, as an example of the determination of sticking of a drug, a drug is determined to be stuck to the inner wall of the cylindrical portion 50*a* of the pooling portion 50 when, for each pixel of the imaging element, the percentage of pixels having luminance values that match those in the basic image or the percentage of pixels having luminance values that differ from those in the basic image within a predetermined range is less than a predetermined percentage with respect to the total number of pixels. In a case in which a determination is made that a drug is stuck to the inner wall of the cylindrical portion 50*a* of the pooling portion 50, the controller 8 can output an alert. At this time, the drug packaging process may be continued or may be interrupted. Further, the controller 8 may be configured to cause the storage unit 80 to store the image captured when a determination is made that a drug is stuck to the inner wall of the cylindrical portion 50*a* of the pooling portion 50.

A timing control unit 84 of the controller 8 controls timings such as the imaging timings of the first, second, and third cameras 61, 62, 66 and the first, second, and third remaining drug detection cameras 601, 602, 603, and the turn-on timings of the upper illumination unit 63, the lower illumination unit 64, and the surface light-emitting member 65 in accordance with the rotation operation of the rotating plate portion 5010 of the drug-receiving plate portion 501. Note that, in this embodiment, each time the rotating plate portion 5010 of the drug-receiving plate portion 501 is intermittently rotated by 45 degrees, still imaging is simultaneously performed at the drug imaging position P6 (first and second cameras 61, 62), the drug discharging position P7 (first, second, and third remaining drug detection cameras 601, 602, 603) and the remaining drug confirmation position P8 (third camera 66). Further, for example, the timing control unit 84 performs imaging in the order of the first imaging process, the second imaging process, and the third imaging process. The imaging order may be other than this order. Further, in the imaging, the timing control unit 84 can also control the turn-on timing and the timing of changing the amount of light of the upper illumination unit 63 and the lower illumination unit 64, and the like.

Examples of the timings at which an image of the remaining drug confirmation position P8 is captured by the third camera 66 will be given below. 1. An image of the remaining drug confirmation position P8 is captured at a timing at which the pooling portion 50 has moved to the drug discharging position P7. 2. An image of the remaining drug confirmation position P8 is captured at a timing after the pooling portion 50 has moved to the drug discharging position P7 (predetermined time (1 second) or the like after the movement).

Note that the remaining drug confirmation can also be performed with the third camera 66 disposed at the drug discharging position P7. In this case, an image is captured at a timing after the pooling portion 50 has moved to the drug discharging position P7 (predetermined time (1 second) or the like after the movement).

A drive control unit 85 of the controller 8 controls the motor 503. This control includes not only the intermittent 45-degree rotation operation for the rotating plate portion 5010 of the drug-receiving plate portion 501 but also control of eliminating overlap between the drugs in the pooling portion 50 by rotating the rotating plate portion 5010 forward and backward at a speed higher than the speed of the 45-degree rotation operation.

With the configuration described above, an image of the embossing or the like on a drug positioned with the surface with the embossing or the like facing upward, for example, can be captured by the first imaging process, and an image of the embossing or the like on a drug positioned with the surface with the embossing or the like facing downward can be captured by the third imaging process. This makes it possible to identify the drug in the pooling portion on the basis of the images obtained by the first and third imaging processes, even for a drug with embossing or the like on one side only. Further, the drug quantity can be determined using a shadow image of the drug obtained by the second imaging process. That is, the imaging location for imaging the embossing or the like on the drug and the imaging location for determining the quantity of the drug can be made the same, and thus the drug imaging process can be performed quickly. Note that an embodiment may also be adopted in which only one of the first imaging process and the third imaging process is performed.

Further, in this embodiment, the timing control unit 84 performs each imaging process a plurality of times for a specific drug (same subject) in the pooling portion 50. In this imaging processing, this does not mean that the first imaging process and the third imaging process are performed once each (twice in total), but that the first imaging process and the third imaging process are performed a plurality of times each. Here, in a case in which imaging is performed after waiting for a drug in the vibrating state or the rolling state to become still, the time required for imaging the drug increases. When, as described above, a plurality of images of the same subject are captured within a certain time period, since a plurality of images can be obtained, an image of the drug with the embossed surface or printed surface of the drug facing the camera direction is more likely to be obtained. Thus, the recognition rate of the embossing or the like can be improved.

Further, in this embodiment, since the first, second, and third imaging processes are performed at one location (drug imaging position P6), the pooling portion 50 does not move and the drug does not vibrate or roll each time imaging is performed. This is preferable because blurring of the captured drug image can be reduced. Further, when the first, second, and third imaging processes are all performed at one location, it is only necessary to wait once for the drugs to stop vibrating or rolling. Thus, the time taken for the imaging process can be shortened even when imaging is performed after waiting for the drugs to stop vibrating or rolling.

By providing the third camera 66, a drug stuck to the inner wall surface of the cylindrical portion 50*a* can be uncovered, and a user can be notified that the packaged drug may not match the prescription information (packaging data).

Figure 11:
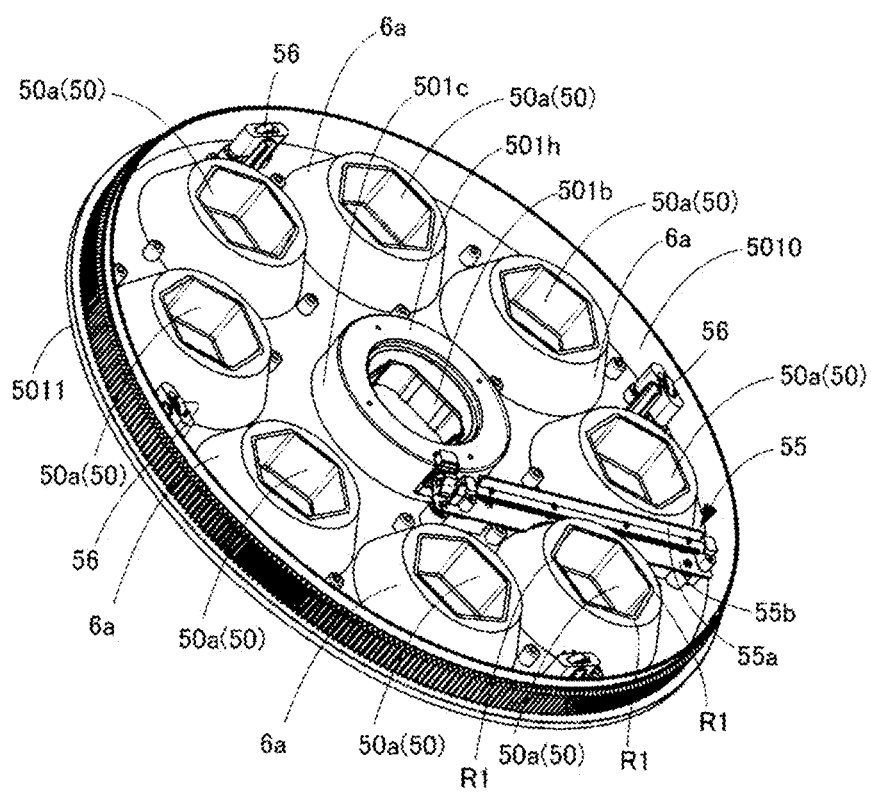
FIG. 11 is a perspective view illustrating a bottom surface side of the drug-receiving plate portion.

As illustrated in FIG. 11, a cleaning member 55 that cleans the top of the drug-receiving bottom portion 5012 is provided on the bottom surface side of the rotating plate portion 5010, at a location where the pooling portion 50 is not formed. The cleaning member 55 can eliminate or reduce packaging of drug powder (drug waste) on the drug-receiving bottom portion 5012 together with the drugs. The cleaning member 55 includes, for example, a scraper 55a and a support portion 55b supporting the scraper 55a. The support portion 55b may be movably supported by the rotating plate portion 5010 so that the scraper 55a can be brought into contact with and separated from the drug-receiving bottom portion 5012. When the rotating plate portion 5010 rotates about the shaft 504 with the scraper 55a in contact with the drug-receiving bottom portion 5012, the scraper 55a scrapes the drug powder on the drug-receiving bottom portion 5012 into an accommodating recessed portion 5012b described below and the drug powder collection groove 5012c.

Note that the shaft 504 includes a flange portion at a lower portion thereof, and this flange portion is fixed to the lower plate portion 52. Further, a bearing is fitted to an outer peripheral portion of the shaft 504, and a quadrangular protruding portion 504a is rotatably supported at an outer peripheral side of the bearing (refer to FIG. 5). As illustrated in FIG. 7, a central quadrangular opening portion 501b having a substantially cylindrical shape and a quadrangular opening into which the quadrangular protruding portion 504a is fitted is formed at the center of the drug-receiving plate portion 501. With this configuration, the drug-receiving plate portion 501 can be detachably attached to the quadrangular protruding portion 504a.

Figure 15:
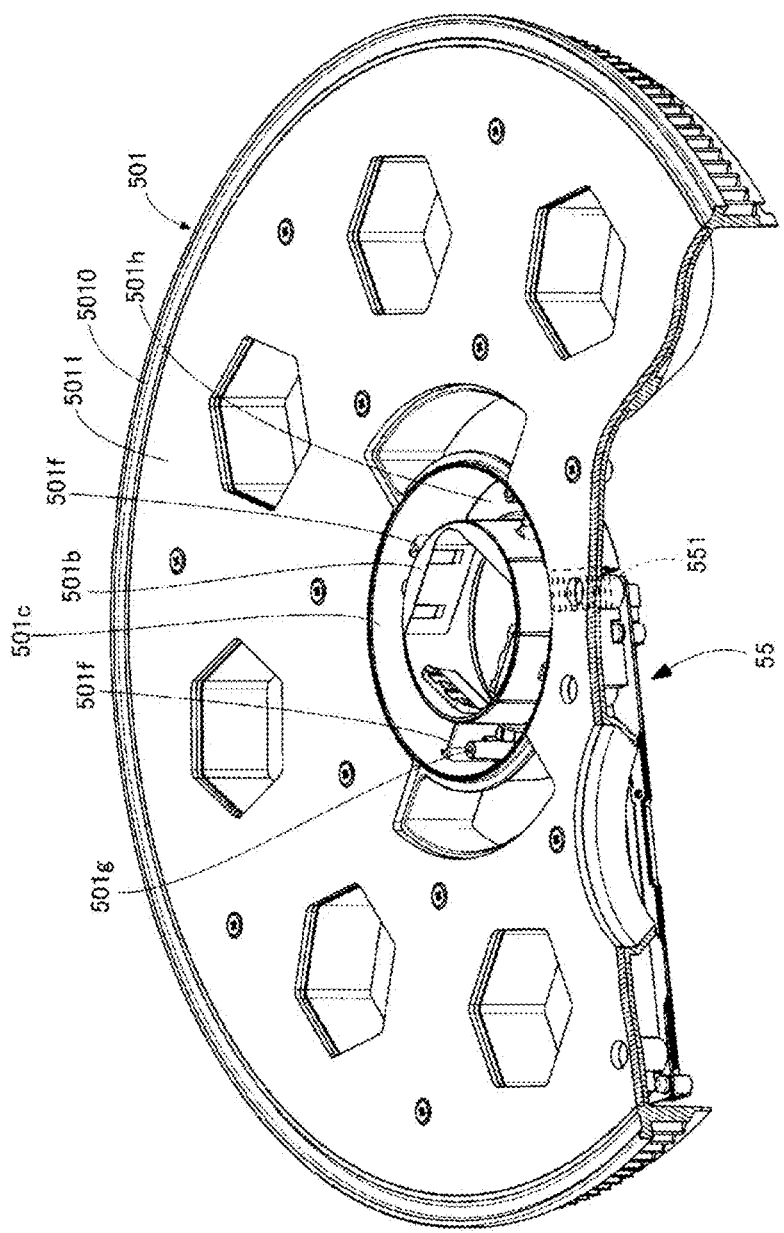
FIG. 15 is an explanatory view illustrating the structure of the drug-receiving plate portion at a central portion.

Further, as illustrated in FIG. 15, the central quadrangular opening portion 501b is coupled and fixed to a cylindrical rising portion 501c by a plurality of coupling rib portions 501f. The cylindrical rising portion 501c is positioned away from an outer peripheral side of the central quadrangular opening portion 501b. The cylindrical rising portion 501c is a member positioned in a central portion of the rotating plate portion 5010 and is fixed to the rotating plate portion 5010. In the rotating plate portion 5010, a plurality of guide columns 501g protruding in an axial direction of the shaft 504 are formed in a circular gap portion formed between the outer peripheral side of the central quadrangular opening portion 501b and the cylindrical rising portion 501c.

A cleaning switch operation portion 501d (refer to FIG. 17) is inserted into the circular gap. The cleaning switch operation portion 501d includes a plurality of hole portions into which the guide columns 501g are inserted, can move linearly in the axial direction of the shaft 504 through these holes, and can integrally rotate about the shaft 504 with the rotating plate portion 5010. Note that the cleaning switch operation portion 501d is formed with notch portions 501k (refer to FIG. 17) through which the coupling rib portions 501f extend. Further, a support plate portion 501h of the rotating plate portion 5010 is positioned below the cleaning switch operation portion 501d. The support plate portion 501h is a member positioned at the central portion of the rotating plate portion 5010 and is fixed to the rotating plate portion 5010. The support plate portion 501h is indicated by an imaginary line in FIG. 17 and FIG. 18.

Figure 17:
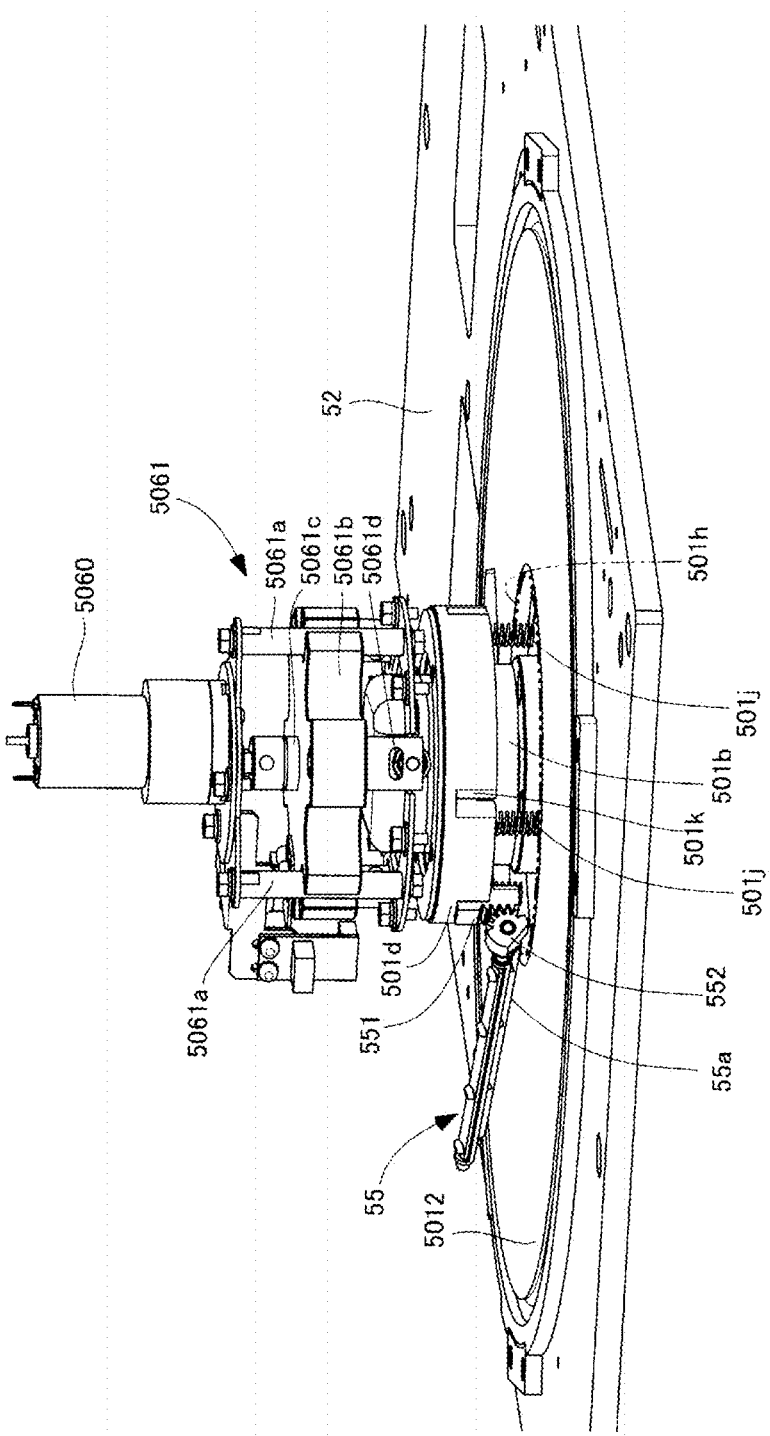
FIG. 17 is an explanatory view illustrating a cleaning switch operation portion, a motor, the cleaning device, and other components.

As illustrated in FIG. 17, a coil spring 501j is disposed between the cleaning switch operation portion 501d and the support plate portion 501h, and the cleaning switch operation portion 501d is biased upwardly by the coil spring 501j. When cleaning the drug powder, the cleaning switch operation portion 501d is moved downward. The downward movement of the cleaning switch operation portion 501d is performed by a motor 5060. The motor 5060 and a support mechanism 5061 supporting the motor 5060 are attached to the upper plate portion 51.

In the support mechanism 5061, a plurality of guide posts 5061a are erected in the axial direction of the shaft 504, and a pressing member 5061b guided in the vertical direction by the guide posts 5061a is engaged with the guide posts 5061a. A feeding screw 5061c is screwed into a screw hole formed in a central portion of the pressing member 5061b. When the feeding screw 5061c is driven by the motor 5060, the pressing member 5061b is moved up and down. A plurality of wheel portions 5061d in contact with an upper surface of the cleaning switch operation portion 501d are attached at a lower surface side of the pressing member 5061b. That is, even in a state in which the cleaning switch operation portion 501d is pressed by the pressing member 5061b, the cleaning switch operation portion 501d (rotating plate portion 5010) can smoothly rotate about the shaft 504 because the cleaning switch operation portion 501d is in contact with the pressing member 5061b via the wheel portions 5061d. Note that the motor 5060 may be installed at a position other than the central position of the support mechanism 5061.

Figure 16:
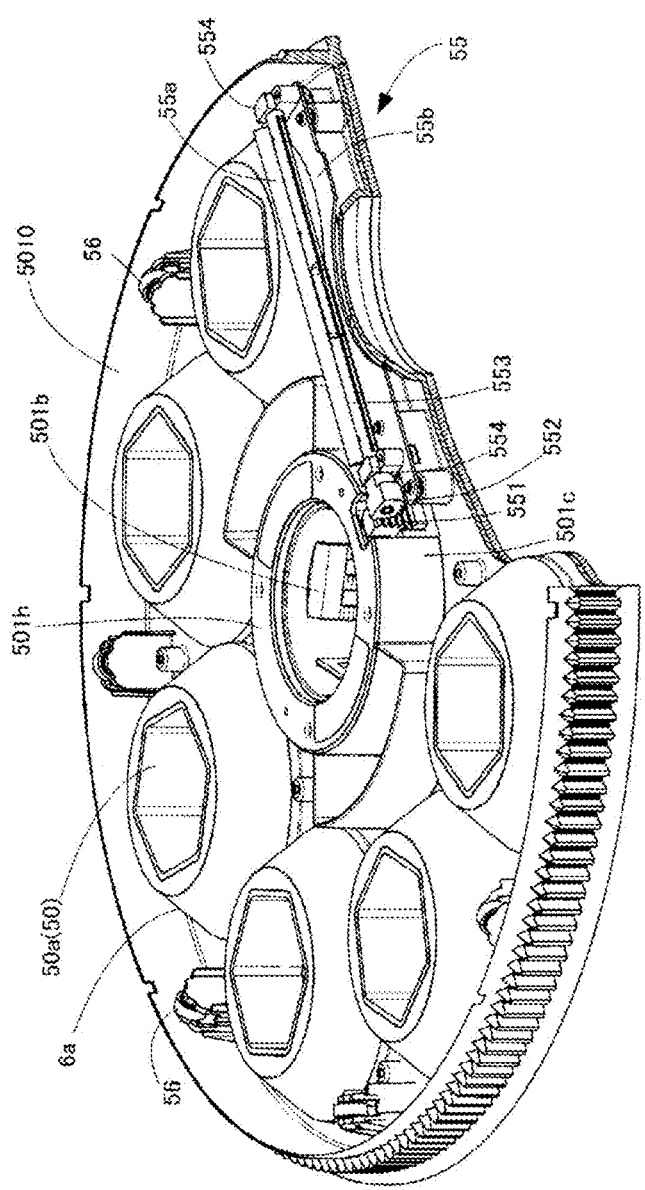
FIG. 16 is an explanatory view illustrating the bottom surface side of the drug-receiving plate portion and a cleaning device.

A rack portion 551 including teeth formed in the axial direction of the shaft 504 is fixed to a side surface of the cleaning switch operation portion 501d. As illustrated in FIG. 16, a notch that exposes the rack portion 551 is formed in the cylindrical rising portion 501c.

Figure 18:
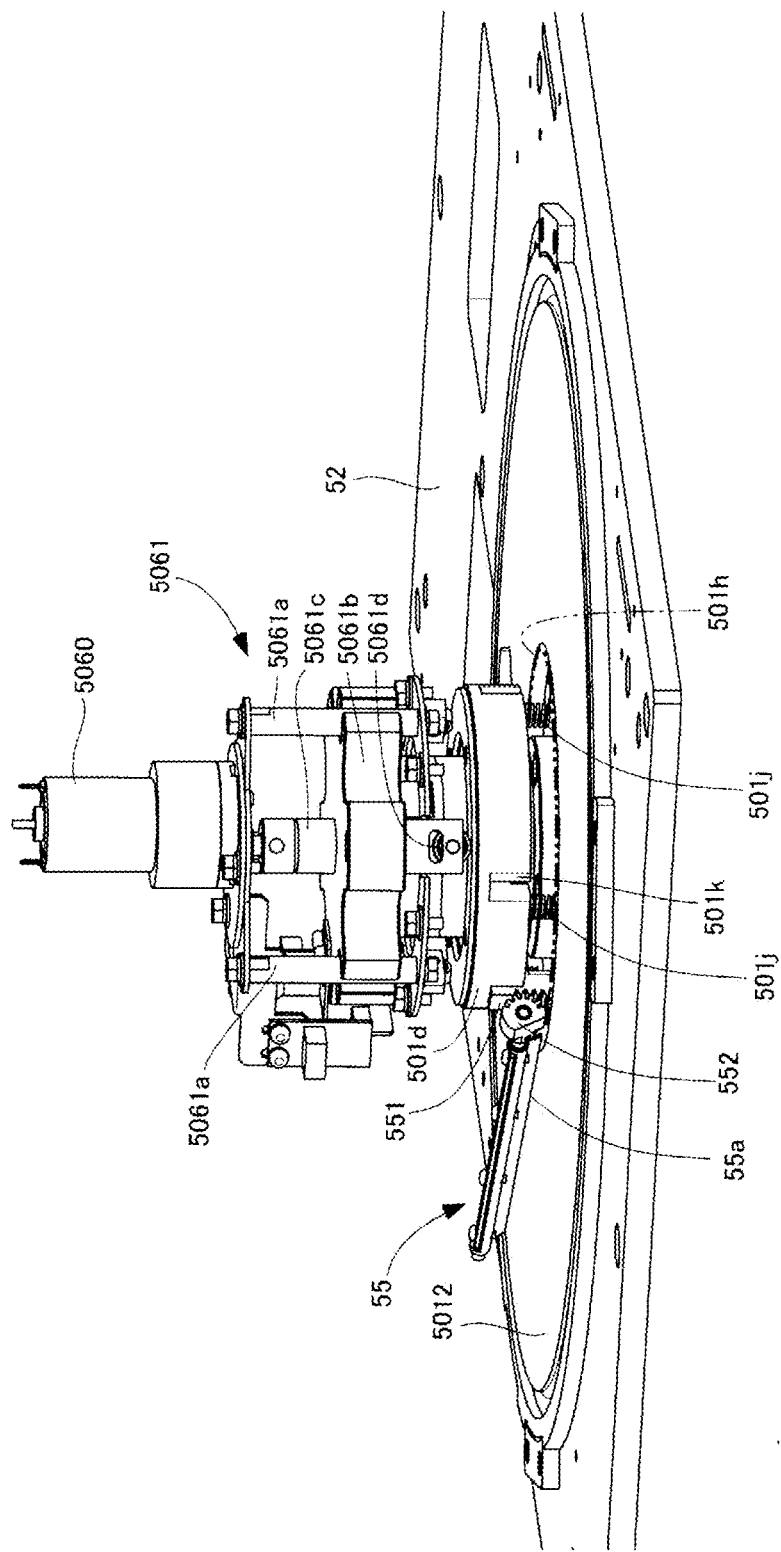
FIG. 18 is an explanatory view illustrating a state in which a scraper of the cleaning device is raised from the state illustrated in FIG. 17.

The cleaning member 55 includes a shaft portion 553. The shaft portion 553 is rotatably supported by a shaft-receiving portion 554 provided on the support portion 55b. Further, a gear portion 552 that is meshed with the rack portion 551 is fixed to one end side of the shaft portion 553. As illustrated in FIG. 18, when the cleaning switch operation portion 501d is lowered when the motor 5060 is driven during cleaning, the rack portion 551 descends, the gear portion 552 rotates, and the shaft portion 553 rotates. The scraper 55a fixed to the shaft portion 553 is raised by the rotation of the shaft portion 553, and an edge portion of the scraper 55a comes into contact with the drug-receiving bottom portion 5012. After the cleaning is complete, a reverse operation of the operation described above is performed by reverse rotation of the motor 5060.

That is, in this embodiment, the drug packaging device 1 includes the drug supply unit (drug accommodating/dispensing unit 11) configured to supply various types of drugs, the drug packaging portion 45 configured to package the drugs supplied from the drug supply unit in the packaging sheet S, the pooling portion 50 configured to temporarily pool, upstream of the drug packaging portion 45, the drugs supplied from the drug supply unit, and the cleaning member 55 serving as a cleaning device provided to the drug-receiving plate portion 501 and configured to remove the drug powder on the drug-receiving bottom portion 5012. The drug packaging device 1 may be configured to include the cleaning device and not include the imaging unit 60.

Furthermore, in the above-described cleaning device, a state in which the edge portion of the cleaning member 55 (scraper 55a) is raised and a state in which the edge portion is in contact with the drug-receiving bottom portion 5012 may be switched.

As an example of the switching, the drug packaging device 1 includes the cleaning switch operation portion 501d that rotates together with the rotating plate portion 5010, is linearly movable in the axial direction of the shaft 504 rotatably supporting the rotating plate portion 5010, and is configured to switch between a state in which the cleaning member 55 is in contact with the drug-receiving bottom portion 5012 and a state in which the cleaning member 55 is not in contact with the drug-receiving bottom portion 5012 by linear movement in the axial direction of the shaft 504, and the driving portion (motor 5060, support mechanism 5061, etc.) configured to move the cleaning switch operation portion 501d in the axial direction of the shaft 504.

Furthermore, in the cleaning device, the drug-receiving bottom portion 5012 may be rotatable as described below.

When the cleaning member 55 (scraper 55a) is integrated with the rotating plate portion 5010, the cleaning member 55 (scraper 55a) is also detached when the rotating plate portion 5010 is removed from the drug packaging device 1. As a result, the cleaning work of the drug-receiving bottom portion 5012 and the lower plate portion 52 is facilitated.

Further, in this embodiment, the cleaning switch operation portion 501d that switches the cleaning operation of the cleaning member 55 is attached to the rotating plate portion 5010 side, and the motor 5060 and the support mechanism 5061 that cause the cleaning switch operation portion 501d to operate are attached to the upper plate portion 51. In other words, since the drug-receiving plate portion 501 itself of the drug pooling unit 5 has a structure that does not include a driving system, the drug-receiving plate portion 501 can be easily removed from the drug packaging device 1. Note that the entire drug-receiving plate portion 501, including the drug-receiving bottom portion 5012, may be removed or components of the drug-receiving plate portion 501 not including the drug-receiving bottom portion 5012 may be removed.

Further, when the drug-receiving bottom portion 5012 is provided, drug powder is less likely to stick to the lower plate portion 52. Further, the drug-receiving bottom portion 5012 can be removed from the lower plate portion 52 and washed. Note that, in the structure illustrated in FIG. 4 and other figures, the user can hold a handle 505 and raise the upper plate portion 51 (including the motor 5060, the support mechanism 5061, etc.) to expose an upper surface side of the drug-receiving plate portion 501 and, in this state, separate the drug-receiving plate portion 501 from the shaft 504 (quadrangular protruding portion 504a).

Note that the scraper 55a (shaft portion 553) extends from an outer peripheral side of the rotating plate portion 5010 to the central portion of the rotating plate portion 5010. An end portion side of the scraper 55a positioned at the central portion is positioned eccentrically from the center of the rotating plate portion 5010 and positioned on the side delayed from an end portion side of the scraper 55a positioned on the outer peripheral side of the rotating plate portion 5010 with respect to the forward rotation direction of the rotating plate portion 5010. Thus, the drug powder scraped from the top of the drug-receiving bottom portion 5012 can be moved to the central portion of the drug-receiving bottom portion 5012 by the rotation of the rotating plate portion 5010.

With a configuration that includes the cleaning member 55, the drug powder is removed from the top of the drug-receiving bottom portion 5012 during rotation of the rotating plate portion 5010. This makes it possible to eliminate the need for the user to clean the top of the drug-receiving bottom portion 5012. Without such a need, it is possible to solve the problem of insufficient illumination due to drug powder in the pooling portion 50 positioned at the drug imaging position P6, the problem of misidentifying a lump of drug powder as a single drug, and other problems.

Note that the drug powder cleaning performed by the cleaning member 55 may be automatically performed each time the person corresponding to the drug prescription changes. The timing, however, is not limited thereto and, for example, the drug powder cleaning may be automatically performed each time the packaging process for a set number of packets (for example, 10 packets) is complete. Further, the drug powder cleaning may be performed when grime on the bottom of the pooling portion 50 positioned at the drug imaging position P6 is detected by a sensor or in an image captured by a camera, or when a user presses a cleaning switch. Note that, when the determination is made that cleaning is required, the supply of drugs to the pooling portion 50 may be stopped, and all drugs present in the pooling portion 50 at that time may be packaged. However, in a case in which drugs prescribed for the morning, afternoon, and evening are only a single type (which can be determined by the prescription information), packaging the drugs and the drug powder together is unproblematic, and thus determination of the necessity of cleaning need not be performed.

Further, the drug powder scraped and collected by the cleaning member 55 may be accommodated in the accommodating recessed portion 5012b (refer to FIG. 10) of the drug-receiving bottom portion 5012. Alternatively, the cleaning member 55 may be provided so that the drug powder drops from the packaging opening 5012a. The drug powder that has dropped from the packaging opening 5012a may be packaged in the packaging sheet S positioned below the packaging opening 5012a. That is, the drug powder on the drug-receiving bottom portion 5012 may be scraped and collected by the cleaning member 55 and packaged in the packaging sheet S. For example, after the packaging sheet into which the drugs have dropped from the packaging opening 5012a is sealed to complete a drug packet, an un-packaged portion of the packaging sheet is moved to below the packaging opening 5012a. Then, the cleaning member 55 is moved in the direction of the packaging opening 5012a, and the drug powder collected by the cleaning member 55 is dropped from the packaging opening 5012a. As a result, packaging of the drugs and the drug powder together is avoided. Note that, in a case in which the packaging sheet portion containing the drug powder collected by the cleaning member 55 is part of a continuous packaging strip, a process may be performed in which a packaging sheet cutter (not illustrated) is operated to separate the packaging sheet portion containing the drug powder from the continuous packaging strip. In this case, information identifying the prescription is preferably printed on the leading packaging sheet portion of the subsequent continuous packaging strip.

Note that a cleaning start timing of the cleaning member 55 need only be set such that the timing at which the drug is dropped from the packaging opening 5012a is different from the timing at which the drug powder is dropped by the cleaning member 55. For example, the cleaning start timing of the cleaning member 55 is set to a timing after drugs are discharged from all pooling portions 50 that pool the drugs, that is, after all pooling portions 50 that pool the drugs have been moved to the drug discharging position P7.

Figure 3B:
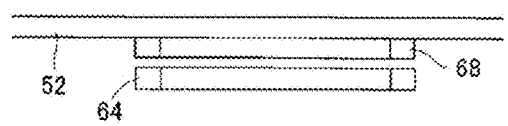
FIG. 3B is an explanatory view illustrating a configuration example in which a light adjusting member is used instead of a surface light-emitting member.

Further, as illustrated in FIG. 3B, instead of the surface light-emitting member 65, a light adjusting member 68 may be provided on a lower side of the bottom surface of the pooling portion 50 and on an upper side of the lower illumination unit 64. The light adjusting member 68 can be switched between a transparent state and a translucent state. The first imaging process and the third imaging process are performed in the transparent state of the light adjusting member 68, and the second imaging process is performed in the translucent state of the light adjusting member 68 with the lower illumination unit 64 turned on. Note that, as the light adjusting member 68, a liquid crystal film that becomes a transparent film by energizing the film in a milky white state can be used.

Combinations of the imaging processes and the turn-on processes described above are shown in Table 2 below.

TABLE 2

| Imaging process | First imaging process | Second imaging process | Third imaging process |
|---|---|---|---|
| Imaging direction | Imaging from above | Backlit imaging from above | Imaging from below |
| Upper illumination unit | ON | OFF | OFF |
| Light adjusting member | Transparent | Translucent | Transparent |
| Lower illumination unit | OFF | ON | ON |

Note that, in the first imaging process, the light adjusting member may be translucent.

Further, the amount of light of each of the upper illumination unit 63 and the lower illumination unit 64 is preferably adjustable. In a case in which whether a current pooled drug indicated by the prescription information (packaging data) is embossed can be determined, the amount of light during imaging of the embossed drug may be set lower than the amount of light for a non-embossed drug. By reducing the amount of light during the imaging of the embossed drug, it is possible to suppress an event in which the shadow of the embossing disappears and becomes unrecognizable due to excessive light. Here, the amount of light refers to the total amount of light flux passing through a certain surface within a certain time period. The adjustment to the amount of light is an increase or decrease in the light flux from the illumination units 63, 64 to the pooling portion 50, and can be performed by, for example, increasing or decreasing the light flux of each LED constituting the illumination units 63, 64 by performing a pulse width modulation process on a voltage applied to the LED, or increasing or decreasing the total amount of light flux reaching the pooling portion 50 by increasing or decreasing the number of LEDs that are turned on.

Further, in the first imaging process, the second imaging process, and the third imaging process, simultaneous imaging may be performed for imaging combinations that can be performed simultaneously. Further, the adjustment to the amount of illumination light may be performed in two stages of the first amount of light and the second amount of light less than the first amount of light, and the drug imaging may be sequentially performed as follows, for example: first imaging process with the first amount of light, first imaging process with the second amount of light, second imaging process, third imaging process with the first amount of light, third imaging process with the second amount of light. Note that the shutter speeds of the first and second cameras during imaging of an embossed drug may be set higher than the shutter speed for a non-embossed drug. By adjusting the shutter speeds in this manner, it is possible to obtain the effect of suppressing the phenomenon in which the shadow of the embossing disappears, making the embossing unrecognizable, similarly to the adjustment to the amount of light described above.

In the embodiment described above, the first imaging process, the second imaging process, and the third imaging process are performed at the single drug imaging position P6. However, no such limitation is intended, and the first imaging process, the second imaging process, and the third imaging process may be performed at a plurality of drug imaging positions.

Further, in the embodiment described above, the plurality of drugs of one packet portion (same packet) are all pooled together in one pooling portion 50 and imaged by the processing of the controller 8. However, no such limitation is intended. Instead of all of the plurality of drugs of one packet portion being pooled together in one pooling portion 50, separate pooled imaging may be performed by the processing of the controller 8. In separate pooled imaging, the plurality of drugs of one packet are separately pooled spatially or temporally in different pooling portions 50, and the imaging is performed for the drugs (fewer drugs) thus separately pooled. A separate pooling condition indicating whether the plurality of drugs of the same packet portion needs to be separately pooled is stored in a sorting information unit 88 of the controller 8. Upon determination that the plurality of drugs of the same packet portion are drugs to be separately pooled on the basis of the separate pooling condition stored in the sorting information unit 88 (with the controller 8 operating as a sorting determination unit), the controller 8 separately pools the plurality of drugs of the same packet portion in a plurality of the pooling portions 50, and then performs the drug imaging process, the drug dispensing process, and other processes.

For example, as a mode in which the plurality of drugs of one packet portion are spatially separated among the pooling portions 50 at different positions, the controller 8 separately pools the plurality of drugs of one packet portion in a plurality of the (e.g., two) pooling portions 50 and performs the imaging at one or a plurality of the drug imaging positions. After the plurality of pooling portions 50 pass through the drug discharging position P7 (packaging position), the drugs are packaged in the packaging sheet, and the plurality of drugs for the same package are ultimately packaged together.

As an example, in a case in which the plurality of drugs for the same package portion are A, B, C, D, the controller 8 operates a cassette a accommodating the drug A and a cassette b accommodating the drug B to pool the drugs A, B in one pooling portion 50, and then operates a cassette c accommodating the drug C and a cassette d accommodating the drug D to pool the drugs C, D in the next one pooling portion 50. Then, at the drug imaging position P6, the controller 8 sequentially performs imaging for the first pooling portion 50 and imaging for the second pooling portion 50.

As a mode in which the plurality of drugs of one packet portion are temporally separated across different pooling portions 50, the controller 8 pools the plurality of drugs of one packet portion at different times in one pooling portion 50 and performs the imaging at the drug imaging position P6 at different times. In this case, the one pooling portion 50 passes through the drug discharging position P7 (packaging position) a plurality of times due to a plurality of rotations of the rotating plate portion 5010, thereby dropping all of the plurality of drugs of the packet portion into the packaging sheet which has stopped moving.

In this way, when a plurality of drugs of one packet portion are separately pooled spatially or temporally in different pooling portions 50 and imaging of the drugs in the pooling portions 50 is performed, suitable images of the drugs can be obtained. That is, when a large number of drugs are present in one pooling portion 50, the drugs readily pile up on top of one another, lean against one another, or the like, and this often results in poorly captured images. On the other hand, when the separate pooled imaging of the drugs is performed, the probability of the drugs piling up on top of one another, leaning against one another, and the like is reduced, and suitable images of the drugs can be obtained. Further, even in a case in which the inspector performs a visual inspection on the basis of a captured image of the drugs, inspection is easier because the number of drugs in the image is smaller.

Note that, in a system in which a plurality of drugs for one dosing period are separately packaged and dispensed in groups of two or more, the plurality of drugs for each package portion may be separately pooled for imaging as described above also for a case in which a plurality of drugs are present in a single package. In other words, the plurality of drugs packaged in the same packet are separately pooled for imaging as described above, regardless of whether one packet portion is a package for one dosing period.

Here, the drug imaging device 6 can be defined as a device including a drug imaging unit and a drug sorting unit for the separate pooling. The drug imaging unit is, for example, the imaging unit 60 that captures an image of the drugs in the pooling portion 50. Further, the drug sorting unit includes, for example, the drug pooling unit 5 that separately pools the plurality of drugs packaged in the same packet in the pooling portions 50, and the controller 8.

The separate pooling of the drugs in the separate pooled imaging can also be performed as follows. (1) The drugs are separately pooled so that the number of drugs pooled in the same pooling portion 50 does not exceed a set number (e.g., two). (2) The drugs are separately pooled so that drugs registered as drugs similar to each other in the drug master table are not pooled in the same pooling portion 50 (images of similar drugs are separately captured). For example, one drug A is pooled in one pooling portion 50, and one similar drug A' (A≈A') is pooled in another pooling portion 50. Note that, in a case in which the drug B (B≠A, B≠A') is included, the drug B may be pooled together with the drug A or the drug A' (images of the drug A and the drug A' are separately captured). Note that information stating that certain drugs are similar to each other in the drug master table is not necessarily required. The reference images or the feature data (size, shape, color, or a combination thereof) stored in the drug master table may be used as criteria to determine, for each set of prescription information, whether there are similar drugs among the drugs corresponding to the prescription information, and to separately pool the drugs. (3) The drugs are separately pooled so that drugs of the same type are pooled in the same pooling portion 50 separately from drugs of other drug types. For example, two of the drugs A are pooled in one pooling portion 50, and the drug B (A≠B) is pooled in another pooling portion 50. (4) The drugs are separately pooled so that the pooling portions 50 are differentiated according to a difference in the supply source of the drugs. For example, a drug supplied by manual distribution and a drug supplied by a cassette are pooled separately in different pooling portions 50. Further, for example, a drug supplied by a cassette and a drug supplied by a universal cassette may be pooled separately in different pooling portions 50. (5) The drugs are separately pooled so that drugs of a quantity exceeding a drug quantity that can be inspected in a single inspection are not pooled in the same pooling portion 50. This quantity increases as the area of the bottom of the pooling portion 50 increases, and decreases as the area of the bottom of the pooling portion 50 decreases. Note that the drugs may be separately pooled in a case in which, rather than the drug quantity, a ratio of a value obtained by integrating the area (projected area) of each drug in a plan view to the area of the bottom of the pooling portion 50 is greater than a threshold value. (6) In a case in which drugs to be packaged include a drug for which feature data (including a reference image) is not registered in the storage unit 80 (drug master table), the drugs are separately pooled so that the unregistered drug is pooled in a pooling portion 50 different from the pooling portion 50 in which other drugs are pooled. Note that an image may be captured of the pooled unregistered drug, and that image may be registered in the drug master table as a reference image. Further, after the drug is registered in the drug master table, the process may be configured so that the drug is treated as a registered drug and not subject to separate pooling performed for unregistered drugs. (7) In a case in which the drugs to be packaged include a drug having a registered attribute in the storage unit 80 (drug master table) indicating a product requiring separate pooling, such as a high-risk product, the high-risk drug is separately pooled in a pooling portion 50 different than the pooling portions 50 in which other drugs are pooled.

The separate pooling conditions of (2) to (7) described above indicating whether the separate pooling of drugs based on the set number, the presence or absence of similar drugs, and other factors is to be performed, and the set number of (1) described above are stored in the sorting information unit 88 of the controller 8. Further, information about the presence or absence of a similar drug and the drug type of the similar drug used as conditions for performing the separate pooling are stored in advance in the storage unit 80 (drug master table). The drug master table includes information related to a marking and one or both of a reference image and feature data (size, shape, color) for each drug, and further includes, as described above, information about the presence or absence of a similar drug and the drug type of the similar drug. Note that the area (size) of the drug in a plan view, the shape of the drug in a plan view, the surface color of the drug, and the like can be used as criteria for registering the drug as a similar drug in the drug master table. Similar drugs include drugs defined as similar drugs by a determination made by a person, and drugs mechanically selected by using a similarity determination algorithm on the basis of predetermined similarity criteria. Further, whether the same type of drug is in one package is determined on the basis of prescription information (packaging data). Further, the distinction between a drug supplied by manual distribution and a drug supplied by a cassette can be made by the controller 8 from accommodation information of the drug for each cassette and usage setting information of the manual distribution portion 13.

An example of the separate pooling process based on the separate pooling conditions described above will be described. The controller 8 functions as a sorting determination unit using the information in the sorting information unit 88. The controller 8 (drug packaging device) performs separate pooling upon determination that a packaging process based on a prescription corresponds to one or more of the following cases: a case in which the drugs to be packaged in the same packet include at least two types of drugs having similar features (refer to (2) described above), a case in which the drugs to be packaged in the same packet include different types of drugs (refer to (3) described above), a case in which the drugs to be packaged in the same packet include a drug to be supplied to the pooling portion 50 by a manual drug loading task performed by a person and a drug to be supplied via a drug cassette (refer to (4) described above), and a case in which the drugs to be packaged in the same packet include a drug for which feature data (including a reference image) is not registered in the storage unit 80 (refer to (6) described above).

Furthermore, for example, the controller 8 (drug packaging device) captures an image of an unregistered drug that is pooled in the pooling portion 50, and registers the image as a reference image in the drug master table (refer to (6) described above). Further, after the drug is registered in the drug master table, the drug is treated as a registered drug and is not subject to separate pooling performed for unregistered drugs (refer to (6) described above).

Further, for example, the drug packaging device 1 may include the drug supply unit (drug accommodating/dispensing unit 11) configured to supply various types of drugs, the drug packaging portion 45 configured to package the drugs supplied from the drug supply unit in the packaging sheet S, the pooling portion 50 configured to temporarily pool, upstream of the drug packaging portion 45, the drugs supplied from the drug supply unit, the imaging unit 60 (the number of cameras being unlimited) configured to capture an image of the inside of the pooling portion 50, and the controller 8 configured to, in a case in which the feature data (including a reference image) of the drug specified by the prescription information is not stored in the storage unit 80, create the feature data for the drug supplied in the first packet on the basis of the image captured by the imaging unit 60, and count the number of the drugs in the second and subsequent packets with reference to this feature data.

Note that, in this embodiment, the drug is dispensed in the following manner.

- (α) In a case in which the drug to be dispensed according to the prescription is accommodated in a cassette, the drug is dispensed from the cassette.
- (β) In a case in which the drug to be dispensed according to the prescription is not accommodated in a cassette and the drug can be dispensed from the universal cassette, the drug is dispensed from the universal cassette. The case in which the drug can be dispensed from the universal cassette is a case in which the drug is compatible with the universal cassette and the universal cassette is not set to a mode for dispensing another drug.
- (γ) In a case in which the drug cannot be dispensed from the universal cassette, the drug is dispensed from the manual distribution portion 13.

Here, given that five drugs A, B, C, D, E indicated by the packaging data are to be separately pooled as (A, B, C) and (D, E), the automatic drug identification process based on the captured images of the three drugs A, B, C in one pooling portion 50 may be performed as follows. Specifically, a comparison process of comparing any one of the three drug image portions in the image captured for the one pooling portion 50 with the features (drug size, drug image for matching, etc.) of each of the drugs A, B, C is performed three times, a comparison process of comparing any one of the next drug image portions with the features of the remaining drugs is performed two times, and a comparison process of comparing the last drug image portion with the features of the last drug is performed one time (for a total of six comparisons). Similarly, even in a case in which three drugs A, B, C among five drugs A, B, C, D, E indicated by the packaging data are separately pooled in three pooling portions 50 one by one, the comparison processes may be performed six times in total without narrowing down the matching targets as described above. This can be described as a comparison process (automatic drug identification process) performed without narrowing down the matching targets for the drugs separately pooled in the pooling portions 50. Note that, in the case described above, the drugs A, B, C indicated by the packaging data are not always pooled; there is a possibility that a drug CC is pooled instead of the drug C due to a malfunction.

In the separate pooled imaging described above, by using the drug sorting information indicating the correspondence relationship between each pooling portion 50 and the supply source (that is, drug name) of the drug dispensed to each pooling portion 50, it is possible to narrow down the matching targets for the drugs in the pooling portion 50 and improve the efficiency of the automatic drug identification process. For example, assume that the content of the sorting information for four drugs is "one drug in the 15th drug cassette and one drug in the 18th drug cassette are pooled in the pooling portion at the first drug-receiving position P1, and one drug in the 19th drug cassette and one drug in the 20th drug cassette are pooled in the pooling portion at the first drug-receiving position P1 after the rotating plate portion 5010 is rotated forward by 45 degrees." In this case, since the position of the pooling portion 50 can be specified by the rotation amount of the rotating plate portion 5010, the specified pooling portion 50 can be associated with the name of the drug in the 15th drug cassette and the name of the drug in the 18th drug cassette. Then, the pooling portion 50 reaches the drug imaging position P6, and the feature data (including reference images) of the drugs derived from the name of the drug in the 15th drug cassette and the name of the drug in the 18th drug cassette is associated with the drug images (drug information) captured at the drug imaging position P6, thereby narrowing down the matching targets.

Here, for example, even when six drugs are pooled three by three in two pooling portions 50, in a case in which the drug sorting information has not been stored, matching targets for the drugs in the pooling portions 50 cannot be narrowed down and, in the automatic drug identification as previously described, the comparison process is performed six times, five times, four times, three times, two times, one time, requiring 21 comparison processes. On the other hand, when six drugs are pooled three by three in each of the two pooling portions 50 and the drug sorting information has been stored, the matching targets for the drugs in the pooling portions 50 are narrowed down, and the comparison process is performed six times for the three drugs in each pooling portion 50, requiring a total of only twelve comparison processes.

Specifically, in a configuration in which the automatic drug identification process for the drugs is performed on the basis of drug images obtained by capturing an image of the drugs in the pooling portions 50, provided that the imaging of the drugs is performed after performing separate pooling on the basis of the drug sorting information and the candidate for the feature data (reference image) of the drug to be compared with the captured drug image (drug information) is selected on the basis of the drug sorting information in the automatic drug identification process, the efficiency of the automatic drug identification process can be improved by narrowing down the matching targets of the drugs in the pooling portions 50. Such a configuration provides the advantages of reducing overlap between drugs due to a decrease in the drug quantity in the pooling portion 50 and improving the efficiency of the automatic drug identification process.

Further, in a case in which the six drugs are pooled one by one using the six pooling portions 50 and the drug sorting information has been stored and is utilized, the comparison process of comparing the features of the drugs one-to-one on the basis of the drug sorting information for one drug imaging portion in the captured images of each pooling portion 50 need only be performed six times.

Note that, even in the embodiment in which the six drugs are separately pooled one by one, it is possible to detect an error in which a plurality of drugs are supplied to one pooling portion 50 by confirming the drug quantity in the pooling portion 50 using the backlit imaging process.

On the other hand, in a case in which the drugs are separately pooled one by one, the imaging count for the pooling portion 50 increases, thereby increasing the processing time required for packaging. For example, in the case of (1) described above, given that the drug quantity to be simultaneously pooled is set to, for example, two, the imaging count of the three drugs A, B, C can be reduced to two. Even in a case in which the number of drugs packaged in the same packet is four, the imaging count of the drugs is two. In a case in which the number of drugs packaged in the same packet is five, the imaging count of the drugs is three. Although the imaging count of the drugs increases as described above, using the drug sorting information makes it possible to reduce the number of comparison processes in the automatic identification process of the drugs.

Further, in the cases of (2) to (4) described above as well, the drug sorting information is associated with the captured images of the drugs that have been separately pooled.

Further, the controller 8 separately dispenses the drugs corresponding to one dosing period to a plurality of pooling portions 50 in accordance with specific criteria as described below.

The specific criteria are the following three cases:
(α) a case in which the drugs corresponding to one dosing period include two similar drugs;
(β) a case in which the drugs include different drugs (same type of drug is discharged to same pooling portion);
(γ) a case in which the supply sources that discharge the drugs include the manual distribution portion 13 and a drug cassette.

Further, the controller 8 specifies, on the basis of the sorting information, the candidates for the reference images to be used for comparison with the drugs included in the captured image (narrows down the matching targets of the drugs).

In the case of (2) described above, the drugs present in the pooling portion 50 are specific drugs supplied from specific cassettes provided in the drug accommodating/dispensing unit 11 or the like. Thus, the information of the drugs in the captured image need only be compared with the information of the specific drugs, thereby narrowing down the drug information to be compared. In particular, for similar drugs that are difficult to differentiate with only a captured image, the matching target to be compared can be narrowed down to one. This is preferable because drug identification can be performed quickly and misidentification is less likely to occur. That is, such a configuration provides the advantages of reducing overlap between drugs due to a decrease in the number of drugs in the pooling portion 50, improving the efficiency of the automatic identification process, and suppressing misidentification of similar drugs.

In the cases of (3) and (4) described above as well, it is possible to narrow down the matching targets of a drug supplied to the pooling portion 50 on the basis of whether the drug types are the same and the supply source of the drug. Since it is only necessary to compare the information of the drug in the captured image with the information of the drugs narrowed down as described above, drug identification can be performed quickly and misidentification is less likely to occur. That is, such a configuration also provides the same advantages as those of (2) described above.

Furthermore, in the case of (4) described above, in a case in which the drugs supplied by manual distribution and the drugs supplied by cassettes are separately pooled in different pooling portions 50, it is also possible to make the criterion for automatic inspection of the drugs supplied by manual distribution and the criterion for automatic inspection of the drugs supplied by the cassettes different from each other. For example, a threshold value of the degree of coincidence at the time of positive determination with respect to the drugs supplied by manual distribution is set higher than a threshold value for the drugs supplied by the cassettes. Further, the inspection methods may be switched for manual supply and cassette supply. For example, visual inspection of a captured image by an inspector is performed for the drugs supplied by manual distribution and, because cassette supply is known to result in fewer errors, automatic inspection by an identification process using a captured image is performed for the drugs supplied by cassettes. Furthermore, the information used for automatic inspection of the drugs may differ between manual supply and cassette supply. For example, the information used for automatic inspection of the drugs supplied by cassettes is the color and shape of the drug, and the information used for automatic inspection of the drugs supplied by manual distribution is not only the color and shape but also the embossing (printing).

In the embodiment described above, the drug powder that has dropped from the packaging opening 5012a is packaged in the packaging sheet S positioned below the packaging opening 5012a, but the cleaning method is not limited thereto. With the cleaning method described below, the amount of the packaging sheet S consumed in drug powder cleaning can be reduced. Further, in a case in which the drug powder cleaning is performed in the middle of packaging drugs for a long-term prescription, the occurrence of packets containing drug powder in the middle of a continuous packaging strip can be avoided. Note that, for example, in the case of packaging drugs for a long-term prescription such as when only the same type of drug is prescribed for morning, afternoon, and evening, inclusion of the drug powder generated by this packaging process along with the drug is considered not particularly problematic and thus, in such a case, drug powder cleaning need not be performed. Whether the drugs prescribed for morning, afternoon, and evening are of the same type can be determined on the basis of the prescription information.

Figure 19:
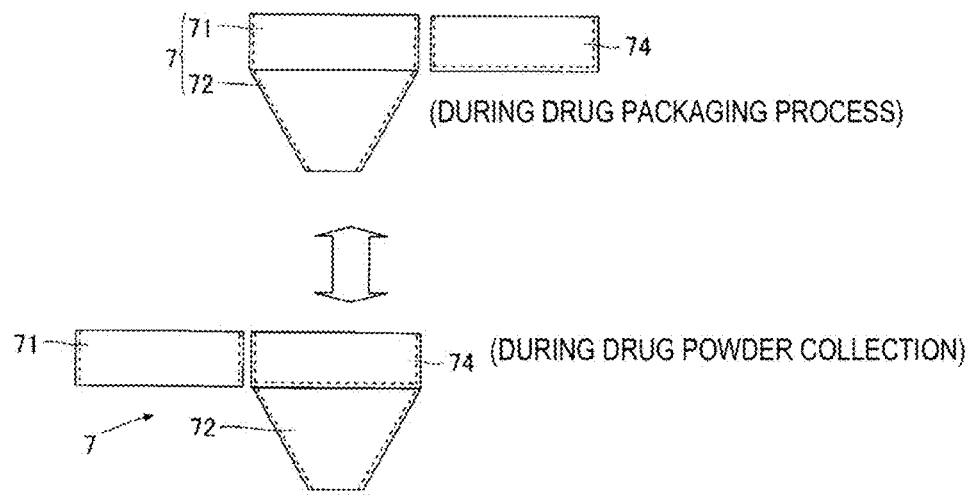
FIG. 19 is an explanatory view illustrating a modified example of drug powder collection.

As an example of drug powder cleaning without use of the packaging sheet S, as illustrated in FIG. 19, a possible configuration is one in which the relay portion 71 of the drug packaging introducing member 7 is moved in the lateral direction relative to the chute portion 72, which is a portion positioned below the relay portion 71, and a drug powder collection box 74 is positioned at a location where the relay portion 71 is not present. For example, when the cleaning of the drug powder by the cleaning member 55 is performed after the drug packaging process has temporarily ended, the relay portion 71 is moved in the lateral direction, the drug powder collection box 74 is positioned instead of the relay portion 71, and the drug powder that has dropped from the packaging opening 5012a is collected by the drug powder collection box 74. After collection of the drug powder, the drug powder collection box 74 is retracted in the lateral direction, and the relay portion 71 is positioned above the chute portion 72.

The relay portion 71 and the drug powder collection box 74 may be moved manually or may be moved by an actuator such as a motor. Further, as an example, a mechanism may be employed in which a support member that supports the relay portion 71 and the drug powder collection box 74 is supported by a vertical shaft so as to be rotatable in a horizontal plane, and the positions of the relay portion 71 and the drug powder collection box 74 are switched when the support member rotates. Further, for example, a gear portion (rack portion) may be provided on the support member, and the support member may be rotated by driving a drive gear meshed with the gear portion. The drug powder collection box 74 is detachable from the support member, making it possible to discard the collected drug powder to a predetermined location.

Note that, in a case in which the relay portion 71 is manually detachable, to ensure appropriate placement orientation when the relay portion 71 is reattached to the chute portion 72, for example, an N-pole of a magnet may be positioned at a predetermined position on the relay portion 71, an S-pole of the magnet may be disposed at a position shifted from the N-pole by, for example, 180 degrees, an S-pole of a magnet may be positioned at an appropriate attachment position at an attachment portion of the relay portion 71 on the drug packaging introducing member 7, and an S-pole of the magnet may be disposed at a position similarly shifted from the N-pole by 180 degrees. With this configuration, when the relay portion 71 is attached at the appropriate orientation, the magnet on the attachment portion side and the magnet on the relay portion 71 side are positioned by attraction and, when the relay portion 71 is attached at an inappropriate orientation, the magnet on the attachment portion side and the magnet on the relay portion 71 side repel each other, thereby making it obvious that the attachment orientation of the relay portion 71 is inappropriate.

For example, a slit portion may be formed in a portion of a side surface of the relay portion 71, and ions emitted by an ionizer may be introduced into the relay portion 71 through the slit portion. This ensures that a drug does not stick to the relay portion 71 or the like due to static electricity. With such a configuration, it is necessary to ensure that the position of the slit portion is not opposite to the normal position. In this regard, the structure in which the magnets are arranged for identifying whether the attachment orientation of the relay portion 71 is appropriate is useful. Note that, the structure is not limited to magnets, and a structure may be adopted in which a recessed portion or a protruding portion is provided on an outer periphery portion of the relay portion 71 and a protruding portion or a recessed portion is provided at the attachment location of the relay portion 71 so that recess-protrusion fitting is not possible when the attachment orientation of the relay portion 71 is inappropriate and recess-protrusion fitting is possible only when the attachment orientation of the relay portion 71 is appropriate.

Figure 20:
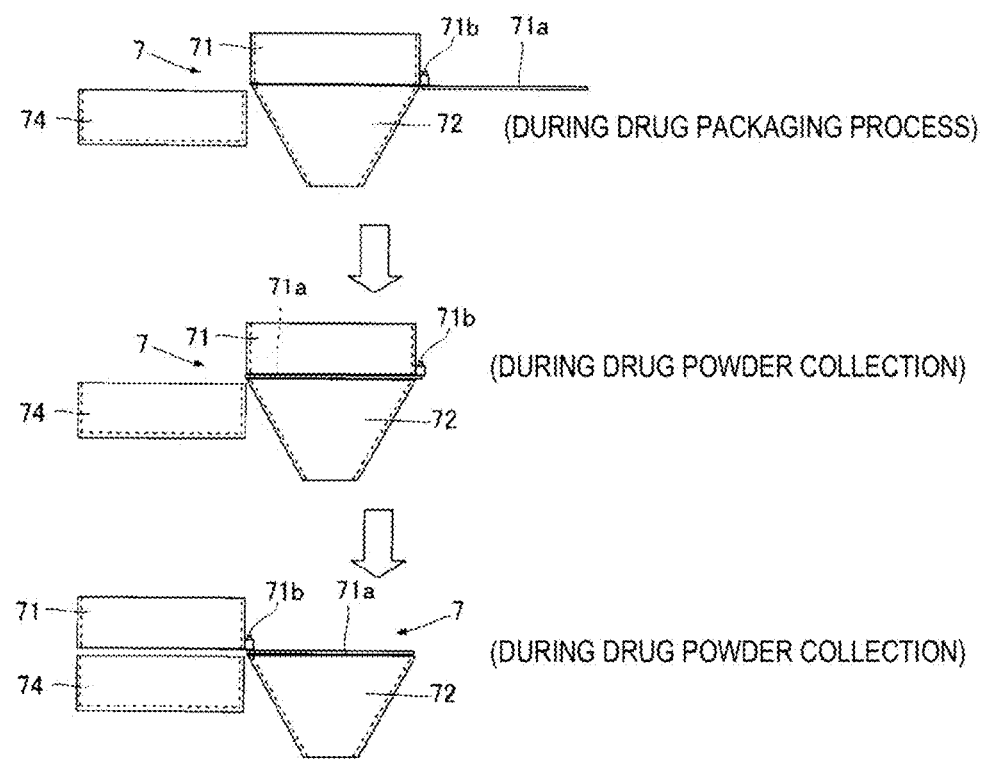
FIG. 20 is an explanatory view illustrating another modified example of drug powder collection.

As another example of drug powder cleaning without use of the packaging sheet S, as illustrated in FIG. 20, there is a configuration in which the relay portion 71 of the drug packaging introducing member 7 is moved in the lateral direction with respect to the chute portion 72 below the relay portion 71, and a bottom portion 71a that is openable and closeable is provided to the relay portion 71. The bottom portion 71a is composed of, for example, a disk-shaped member having a diameter equal to or greater than an outer diameter of the cylindrical shape of the relay portion 71, and can be opened and closed by being rotated by a vertical shaft portion 71b. This opening and closing may be manual or may be performed by an actuator such as a motor.

For example, when the drug packaging process is temporarily ended and the cleaning member 55 performs cleaning of the drug powder, the bottom portion 71a of the relay portion 71 is closed. After cleaning, the relay portion 71 is moved in the lateral direction. The drug powder collection box 74 is disposed below the relay portion 71 moved in the lateral direction. The collected drug power can be dropped into the drug powder collection box 74 by opening the bottom portion 71a of the relay portion 71 moved in the lateral direction. After the drug powder is discarded, the relay portion 71 is returned to the position above the chute portion 72.

Although the drug-receiving bottom portion 5012 is fixed in the embodiment described above, a configuration may be adopted in which, for example, a gear portion is partially formed on a side surface portion of the drug-receiving bottom portion 5012, and a driving gear driven by a motor or the like is meshed with this gear portion so that the drug-receiving bottom portion 5012 is rotatable by a predetermined angle. In this way as well, by making the drug-receiving bottom portion 5012 rotatable, the amount of the packaging sheet S consumed in drug powder cleaning can be reduced.

Figure 21:
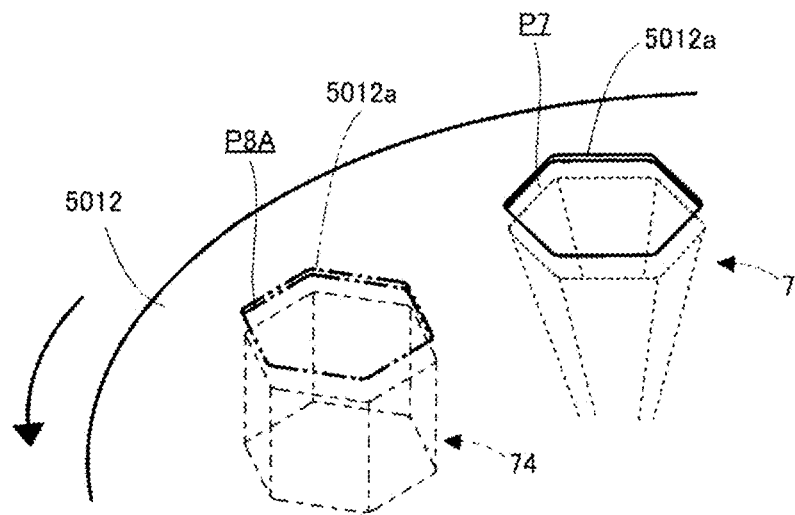
FIG. 21 is an explanatory view illustrating a modified example of drug powder collection.

For example, a configuration may be adopted in which the remaining drug confirmation position P8 is not used for remaining drug confirmation but used as a drug powder collection position P8A for collecting drug powder, and the drug powder collection box 74 is positioned below this drug powder collection position P8A, as illustrated in FIG. 21. When the drug powder is cleaned by the cleaning member 55, the drug-receiving bottom portion 5012 is rotated by 45 degrees to position the packaging opening 5012a at the drug powder collection position P8A. The drug powder scraped by the cleaning member 55 can then be dropped from the packaging opening 5012a into the drug powder collection box 74 by rotating the rotating plate portion 5010 in this state. Note that the drug powder collection position may be provided at a position other than the drug powder collection position P8A. The drug powder collection box 74 is detachably provided on a bottom surface side of the lower plate portion 52.

Further, with a configuration in which the drug-receiving bottom portion 5012 is rotatable as described above, the advantage of eliminating overlap between the drugs in the pooling portion 50 is achieved. In the drug overlap elimination example previously described, the overlap between drugs in the pooling portion 50 is eliminated by the forward and backward rotation of the rotating plate portion 5010 within a predetermined range by the driving of the motor 503. However, when the rotation range of the rotating plate portion 5010 is small, the drugs positioned at the center of the pooling portion 50 may not hit against the wall surface of the cylindrical portion 50a and the overlap between the drugs may not be eliminated. Therefore, even during the process of eliminating the overlap between the drugs, the drug-receiving bottom portion 5012 may be rotated in the opposite direction of the rotation of the rotating plate portion 5010. Thus, even in a case in which the rotation range of the rotating plate portion 5010 for overlap elimination is small, since the amount of relative displacement between the rotating plate portion 5010 and the cylindrical portion 50a is larger, the drugs positioned at the center in the pooling portion 50 are made to hit against the wall surface of the cylindrical portion 50a and the overlap between the drugs can be eliminated.

Although the embodiments of this invention have been described above with reference to the accompanying drawings, this invention is not limited to the illustrated embodiments. Various modifications and changes may be applied to the illustrated embodiments within the scope of this invention or within a scope equivalent thereto.

What is claimed is:

1. A drug imaging device comprising:
an imaging unit configured for drug image capture;
a controller configured to
determine that a dosage period includes a first drug and a second drug,
determine whether a separate pooling condition is satisfied by the first drug and the second drug,
transfer the first drug into a first pooling portion in response to determining that the separate pooling condition is satisfied by the first drug and the second drug,
photograph the first drug in the first pooling portion without the second drug,
transfer the second drug to one of the first pooling portion or a second pooling portion, and
photograph the second drug in the one of the first pooling portion or the second pooling portion without the first drug.

2. The drug imaging device according to claim 1, wherein the separate pooling condition indicates that the first drug and the second drug are visually similar.

3. The drug imaging device according to claim 1, wherein
the separate pooling condition indicates separate pooling of any unregistered drugs, and
the controller determines that at least one of the first drug and the second drug is unregistered.

4. The drug imaging device according to claim 1, wherein the separate pooling condition identifies at least one of the first drug and the second drug for separate pooling.

5. The drug imaging device according to claim 1, wherein
the separate pooling condition indicates separate pooling of cassette-dispensed drugs and manually-dispensed drugs, and
the controller determines that the first drug is cassette-dispensed and the second drug is manually-dispensed.

6. The drug imaging device according to claim 1, wherein
the controller is further configured to determine that the dosage period further includes a third drug,
the separate pooling condition indicates that a maximum number of drugs is exceeded by the first drug, the second drug, and the third drug.

7. The drug imaging device according to claim 6, wherein the separate pooling condition indicates that the first drug and the third drug are a common type of drug, and that the second drug is a different type of drug.

8. The drug imaging device according to claim 1, wherein the separate pooling condition indicates that a maximum number of drugs inspectable within a single inspection is exceeded by the first drug and the second drug.

9. The drug imaging device according to claim 1, wherein the controller is configured to
determine whether each pooling condition among a plurality of separate pooling conditions is satisfied by the first drug and the second drug, and
transfer the first drug into a first pooling portion in response to determining that at least one separate pooling condition among the plurality of separate pooling conditions is satisfied by the first drug and the second drug.

10. A drug packaging device comprising:
a drug supply unit configured to supply the first drug and the second drug;
a drug packaging portion configured to package the first drug and the second drug supplied from the drug supply unit with one or more packaging sheets;
a plurality of pooling portions, including the first pooling portion and the second pooling portion, each pooling portion among the plurality of pooling portions configured to temporarily pool, upstream of the drug packaging portion, the first drug and the second drug supplied from the drug supply unit;
the drug imaging device according to claim 1; and
an image output unit configured for output of images captured by the drug imaging device.

11. A drug packaging device comprising:
a drug supply unit configured to supply various types of drugs;
a drug packaging portion configured to package the drugs supplied from the drug supply unit in a packaging sheet;
a pooling portion configured to temporarily pool, upstream of the drug packaging portion, the drugs supplied from the drug supply unit;
an imaging unit configured to capture an image of the inside of the pooling portion; and
a controller configured to, in a case in which feature data of the drugs supplied from the supply unit specified by prescription information is not stored in a storage unit,
create the feature data for drugs supplied in a first packet on the basis of the image captured by the imaging unit, and
count a number of drugs in a second and subsequent packets with reference to this feature data.

12. A drug imaging device comprising:
an imaging unit configured for drug image capture;
a controller configured to
determine that a dosage period includes a first drug and a second drug,
determine whether the first drug and the second drug comply with at least one separate pooling condition,
transfer the first drug into a first pooling portion in response to determining that the first drug and the second drug do not comply with the at least one separate pooling condition,
photograph the first drug in the first pooling portion without the second drug,
transfer the second drug to one of the first pooling portion or a second pooling portion, and
photograph the second drug in the one of the first pooling portion or the second pooling portion without the first drug.

* * * * *